United States Patent [19]

Iwamoto et al.

[11] 4,311,556

[45] Jan. 19, 1982

[54] METHOD AND SYSTEM FOR INSPECTION OF INSIDE OF NUCLEAR REACTOR VESSEL

[75] Inventors: Taro Iwamoto; Shimon Ando; Sho Kusumoto; Tsutomu Omae; Toshitaka Suzuki, all of Hitachi; Masatake Takidera, Mito; Takaichi Koyama, Hitachi; Kunio Hamada, Mito; Kazuhiro Yoshida, Hitachi, all of Japan

[73] Assignee: Hitachi, Ltd., Tokyo, Japan

[21] Appl. No.: 58,431

[22] Filed: Jul. 18, 1979

[30] Foreign Application Priority Data

Jul. 27, 1978 [JP] Japan .................................. 53-92018

[51] Int. Cl.³ ............................................. G21C 17/00
[52] U.S. Cl. ..................................................... 376/249
[58] Field of Search ..................................... 176/19 R

[56] References Cited

U.S. PATENT DOCUMENTS

| 3,715,914 | 2/1973 | Gross et al. | 176/19 R |
| 3,780,571 | 12/1973 | Wiesener | 176/19 LD |
| 3,809,607 | 5/1974 | Murray et al. | 176/19 R |
| 3,943,756 | 5/1976 | Aubert et al. | 176/19 R |
| 3,988,922 | 11/1976 | Clark et al. | 176/19 R |
| 4,117,733 | 10/1978 | Gugel | 176/19 R |
| 4,131,018 | 12/1978 | Muller et al. | 176/19 R |
| 4,149,932 | 4/1979 | Jacobs et al. | 176/19 R |
| 4,169,758 | 10/1979 | Blackstone et al. | 176/19 R |

FOREIGN PATENT DOCUMENTS 50-127094 10/1975 Japan .
52-5872 2/1977 Japan .
53-138099 11/1978 Japan .

OTHER PUBLICATIONS

S 3045 0060, Conf. on Periodic Inspection of Pressure Vessels, London, (519-11/75), pp. 205-220, Lautzenheiser.

*Primary Examiner*—S. A. Cangialosi
*Attorney, Agent, or Firm*—Craig and Antonelli

[57] ABSTRACT

In a method and a system for inspection of the inside of a nuclear reactor vessel in which an inspection device for inspecting a defect in a nuclear reactor vessel is so moved by a drive/control device as to permit inspection of a part to be inspected in the reactor vessel, and the presence or absence of defect in the reactor vessel is judged based upon information from the inspection device in the course of the above-mentioned movement of the inspection device; the movement of the inspection device is pursued and monitored by monitor means, and the movement of the inspection device is suppressed when an abnormality in the movement of the inspection device is judged based upon information from the monitor means, to avoid the abnormal movement.

15 Claims, 37 Drawing Figures

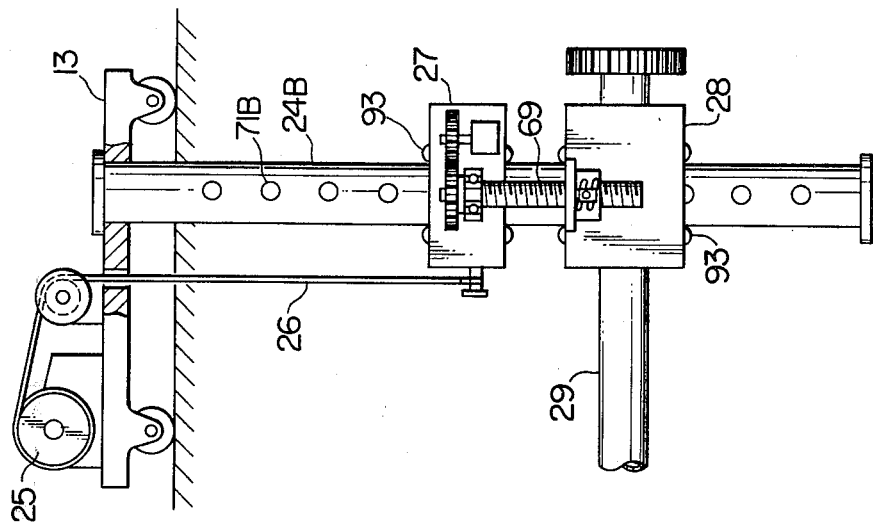
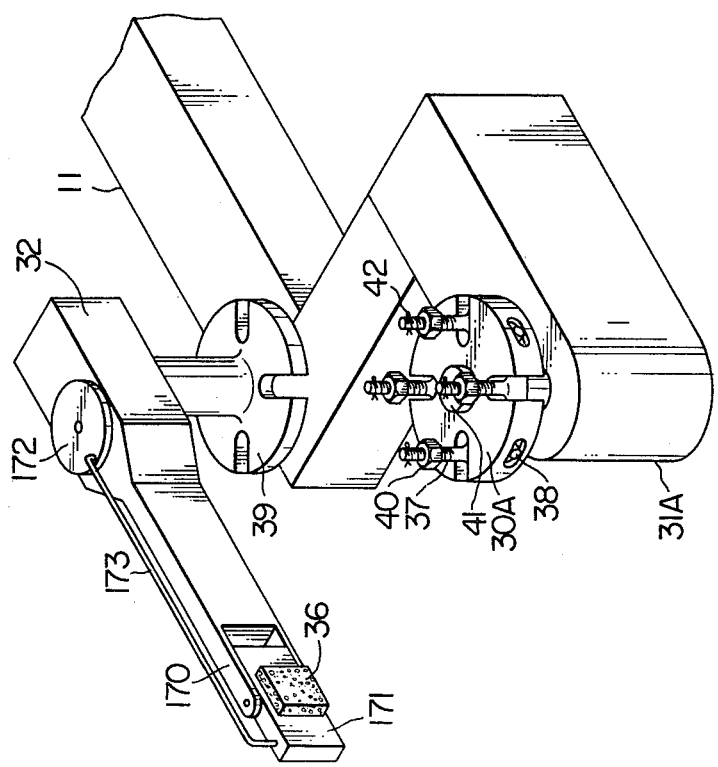

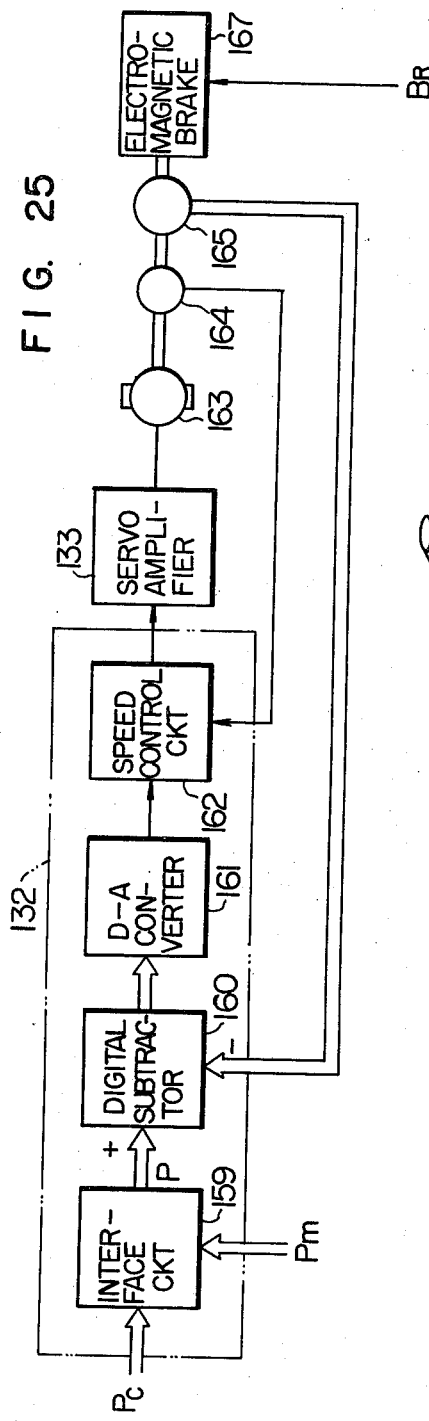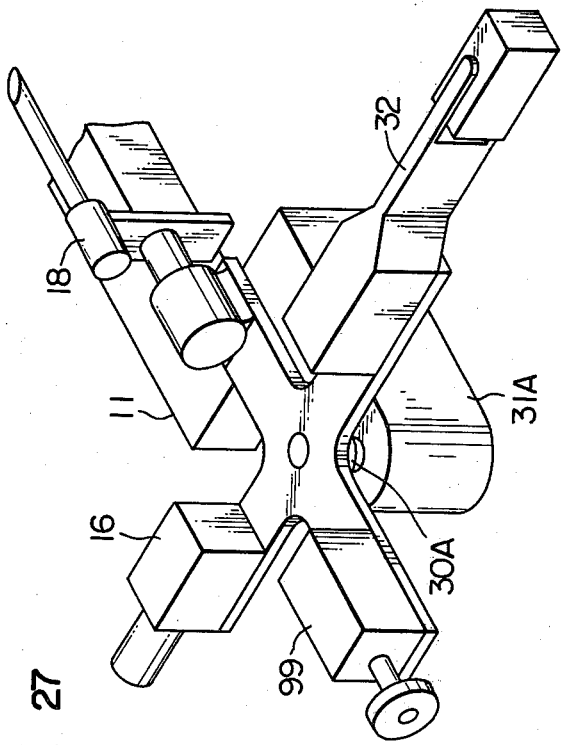

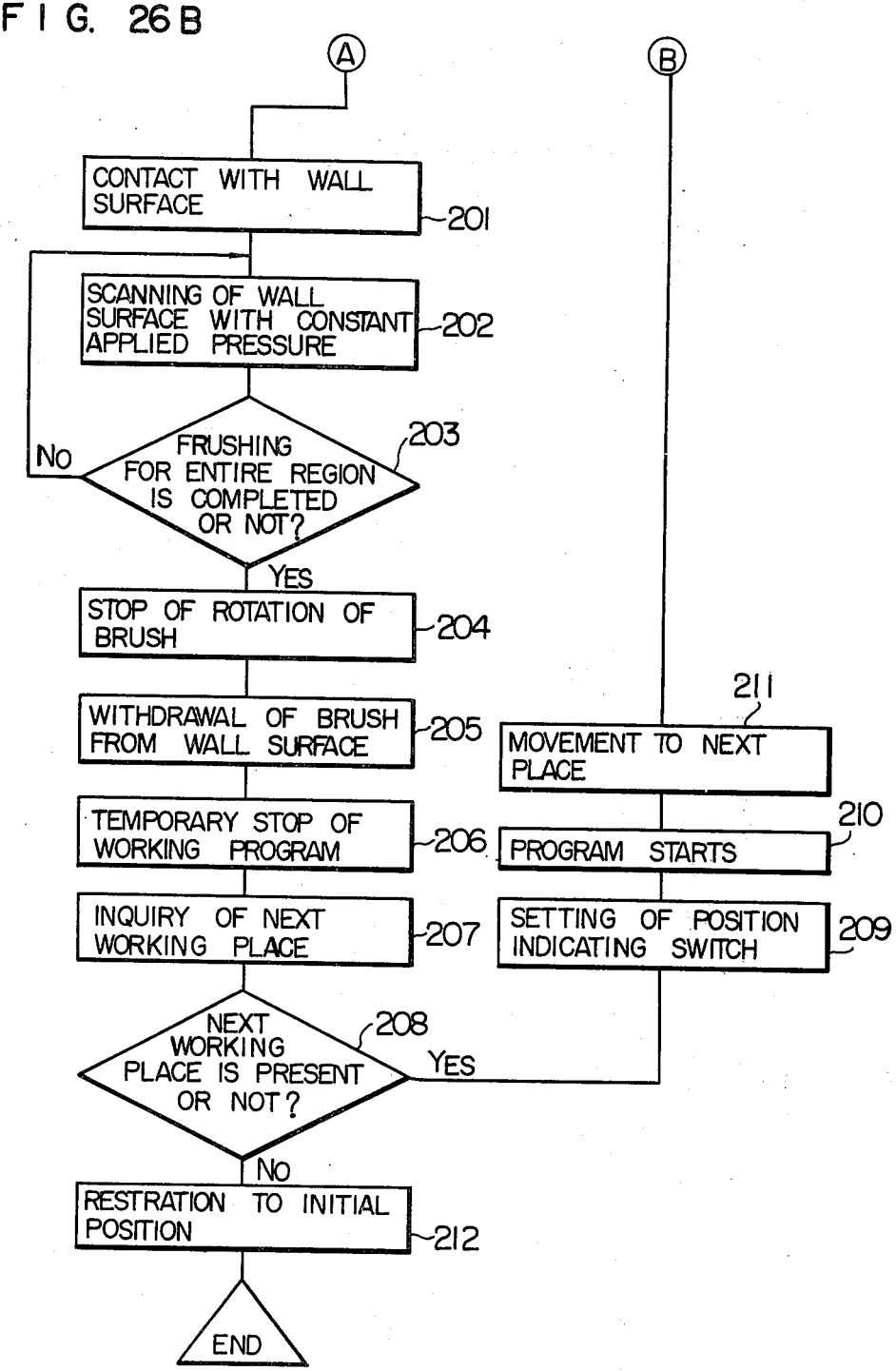

METHOD AND SYSTEM FOR INSPECTION OF INSIDE OF NUCLEAR REACTOR VESSEL

BACKGROUND OF THE INVENTION

1. FIELD OF THE INVENTION

The present invention relates to a method and a system for inspection of the inside of a nuclear reactor vessel, and more particularly to a method and a system for appropriately moving an inspection device within a reactor vessel to permit desired inspection of a part to be inspected in the reactor vessel.

2. DESCRIPTION OF THE PRIOR ART

Nuclear reactors have to be subjected to emergency shut-down when some accident happens in the reactors. The periodical inspection of the inside of the reactor vessel is required to avoid such an unexpected emergency shut-down, and to assure a safety operation of reactor. The inspection of the inside of the reactor vessel is made on such defects as a crack, reduction of thickness, deformation, impression and corrosion, which are generated at the inner wall of a reactor pressure vessel, piping, nozzle portion, or the like.

In nuclear reactors of the pressurized water type, all the structures contained within a pressure vessel can be removed from within the vessel, and therefore it is relatively easy to develop an automatic inspecting operation.

While, nuclear reactors of the boiling water type have a construction in which only a portion of structures contained in a pressure vessel can be taken out of the vessel. Specifically, the nozzle portion of the pressure vessel which is one of the most important inspection targets, is equipped with a feed water sparger and a pipe arrangement for reactor core spray, and the inner wall of the vessel is provided with a guide rod fastened thereto. That is, many obstacles have to be left within the pressure vessel. Therefore, in inspecting the inside of a reactor pressure vessel, it is required to employ a satisfactory monitoring system, and to look to the safety in operations.

At the nozzle portion of the reactor pressure vessel of the boiling water type, the coolant of a high temperature within the vessel comes in contact with the coolant of a low temperature from outside the vessel, and thus cracks are apt to be generated thereat as a result of fatigue due to repetitive thermal stress caused by temperature vibration. Accordingly, inspection of the nozzle portion is specifically required. However, the nozzle portion of boiling water reactor is different in shape from that of pressurized water reactor, and is provided with a corner section having the form of a saddle. For the inspection of such a corner section, it is required to move an inspection device along a complicated 3-dimensional curve, and to support a working unit for inspection by an arm having a large degree of freedom. Further, a control system for the inspection device is necessary to prevent a malfunction which permits damage of parts and elements through collision. Because of such problems, inspection of the pressure vessel of boiling water reactor has been made by persons who get into the vessel to effect inspecting operations. However, the working environment is extremely harmful within the pressure vessel because the inside of the vessel is irradiated with radioactive rays of high level, and is held at a high temperature and a high humidity. Therefore, early automation of inspecting operations is earnestly desired.

Remote control systems for inspecting the inside of nuclear reactor vessel are disclosed in U.S. Pat. No. 3,809,607 entitled "Reactor vessel in-service inspection assembly" and patented on May 7, 1974, in Japanese Patent Application Kokai (Laid-Open) No. 127094/75 entitled "Nuclear reactor vessel testing mechanism" and laid open on Oct. 6, 1975, in Japanese Patent Application Kokoku (Post-Examination Publication) No. 5872/77 entitled "Remote control device for defect detector for inner wall surface of cylindrical vessel" and published on Feb. 17, 1977, and in Japanese Utility Model Application Kokai (Laid-Open) No. 138099/78 entitled "Emergency disengaging device for manipulator arm of reactor vessel testing apparatus" and laid open on Nov. 1, 1978.

Although these patent and applications disclose a device for remotely inspecting the inside of a nuclear reactor vessel, they fail to disclose a monitoring device which monitors the operation of an inspection device to assure appropriate inspection.

The main item of inspection of the inside of reactor pressure vessel includes visual inspection of deformation, wrong mounting, or the like of structures within the vessel, and detection of defects at the inner wall of the pressure vessel and the nozzle portion. As important defect detecting methods, there are known the supersonic test for detecting inner defects and reduction of thickness and the fluid penetration test for detecting surface defects. Each test has its own feature. In the supersonic test, a medium is indispensable which propagates supersonic waves between the surface of an object under examination and a contact. The use of supersonic flaw detector in the water is advantageous, since the water serves as the supersonic wave propagating medium. Accordingly, a supersonic flaw detector to which the present invention is applied, has such a structure as permitting underwater operation.

The fluid penetration test employs a penetrating fluid, and therefore has to be carried out in the air. With a penetration defect detecting apparatus there are automatically conducted the application and wipe of three kinds of fluids including cleaning, penetrating and developing fluids, the brushing operation (which is a pre-treatment) for scraping scales on the surface of an object under examination, and the visual examination of a film made of the developing fluid. When various units for conducting these operations are gathered up into a single unit, the penetration defect detecting apparatus becomes large in volume, and cannot be used in a narrow space of the nozzle portion. Therefore, the apparatus is divided into several kinds of operation or working units, which are mounted on a manipulator capable of getting near the object under examination and are exchanged in accordance with the contents of operation. As another defect detecting method assuming such a system, there is known the electric resistance test in which four electrodes are kept in contact with a surface under examination, an electric current is applied between two of these electrodes, and other two electrodes are used to measure a voltage distribution, in order to detect a change in voltage distribution caused by a defect existing between the measuring electrodes, if any.

SUMMARY OF THE INVENTION

An object of the present invention is to provide a method and a system for inspection of the inside of a nuclear reactor vessel which can readily conduct the inspection of a complicated inside of a reactor vessel.

Another object of the present invention is to provide a method and a system for inspection of the inside of a nuclear reactor vessel which can conduct an appropriate inspection by pursuing and monitoring the movement of a working unit for inspection of the inside of the reactor vessel.

A further object of the present invention is to provide a method and a system for inspection of the inside of a nuclear reactor vessel in which a defect found in the course of the inspection of the inside of the reactor vessel is recorded in a recording device to be used as check information of repair work.

An additional object of the present invention is to provide a method and a system for inspection of the inside of a nuclear reactor vessel in which a working unit for inspection of the inside of the reactor vessel and monitor means for monitoring the movement of the working unit are supported and moved in a related manner by a manipulator.

BRIEF DESCRIPTION OF THE DRAWINGS

FIG. 2A shows a locus of the working unit in inspecting the inner wall surface of the vessel, FIG. 2B a locus of the unit in inspecting a nozzle 4, and FIG. 2C a locus of the unit in inspecting a nozzle 4A.

FIG. 6 is a perspective view for showing a state in which a working unit is mounted on the manipulator shown in FIG. 4.

FIG. 9 is a schematic view for explaining the positioning of a rise and fall base and a crosshead of the manipulator shown in FIG. 4.

FIGS. 17A, 18A, and 19A show picture images displayed by a television monitor. FIGS. 17B, 18B and 19B show the movement of a manipulator.

FIG. 20A shows a state in which the operation is conducted. FIG. 20B shows a picture image of a nozzle portion obtained in the operation.

FIG. 25 is a system diagram of a servo control circuit shown in FIG. 22.

FIGS. 26A and 26B are flow-charts of the automatic brushing operation shown in FIG. 21.

FIG. 27 is a perspective view showing another example of a working unit mounted on an arm of a manipulator.

DESCRIPTION OF THE PREFERRED EMBODIMENTS

Figure 1:
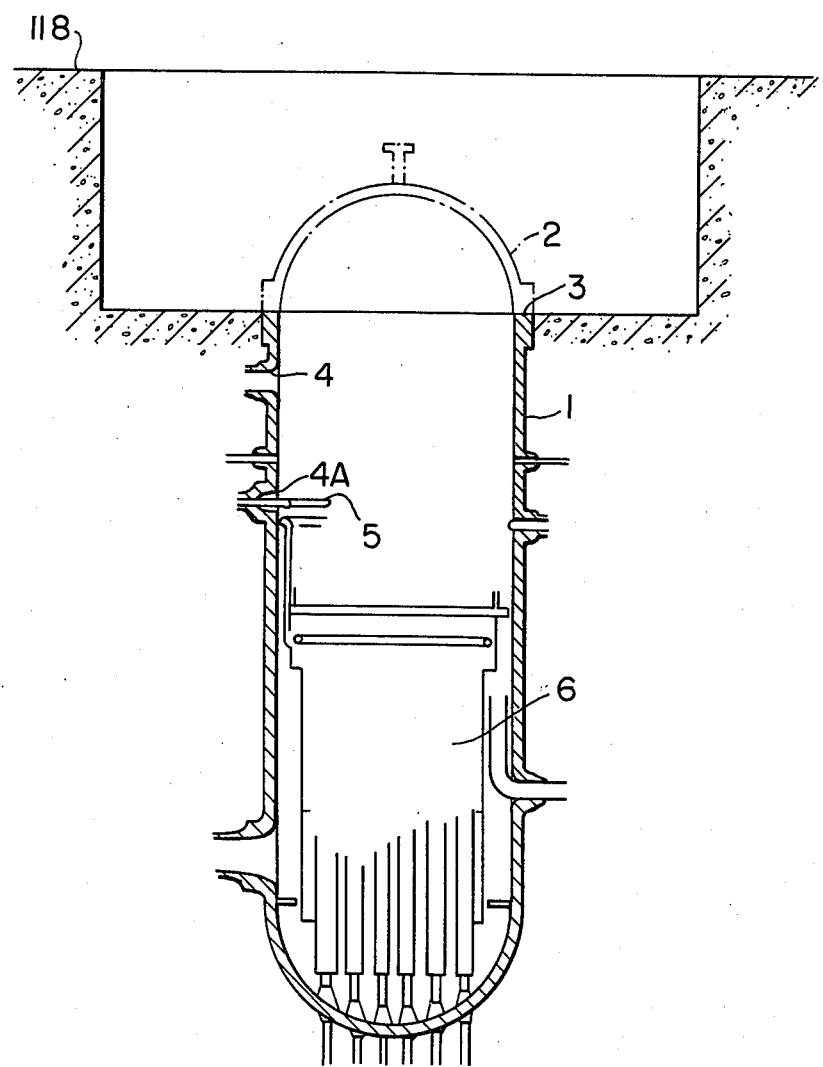
FIG. 1 is a longitudinal sectional view of a pressure vessel of a boiling water reactor.
Figure 3A:
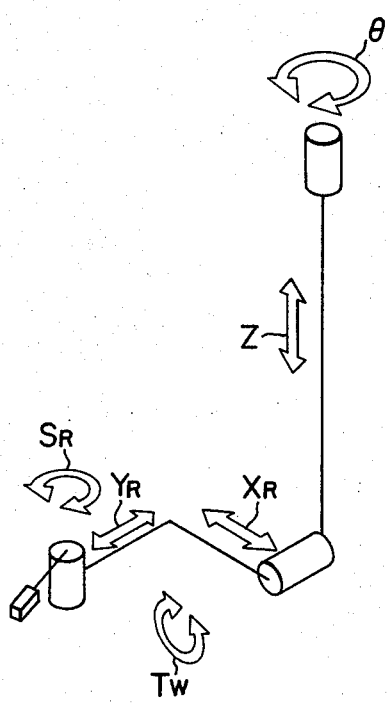
FIGS. 3A and 3B are views for explaining the operation of a manipulator.
Figure 3B:
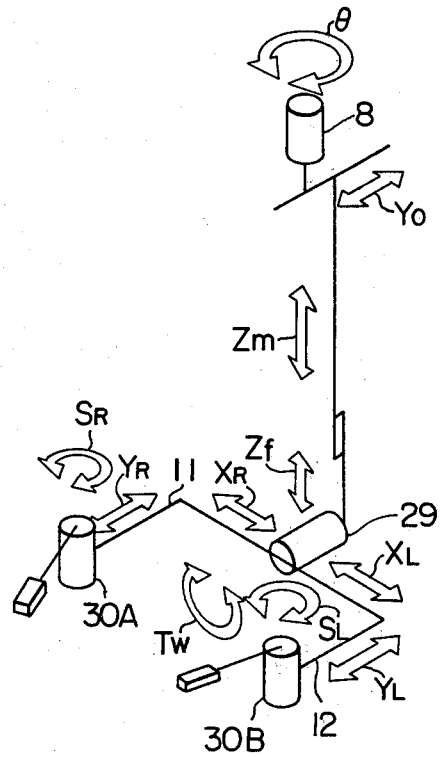
Figure 2A:
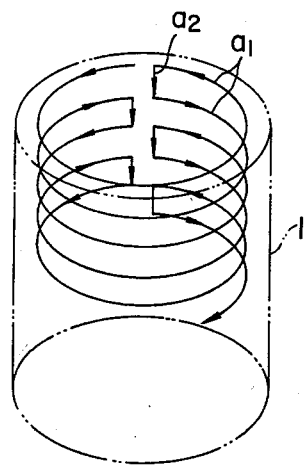
FIGS. 2A and 2C are schematic views for showing the movement of a working unit mounted on a manipulator at the period of inspection of the inside of a reactor vessel.
Figure 2B:
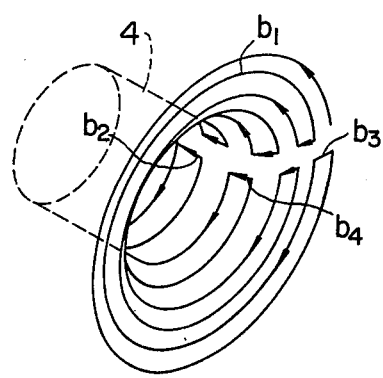
Figure 2C:
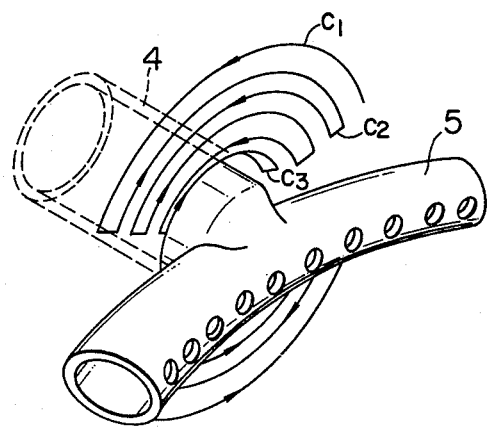

A reactor pressure vessel 1 to be examined is a capsule-typed cylindrical vessel such as shown in FIG. 1. An upper cover 2 is connected with a flange 3 of the pressure vessel 1 through bolts, and therefore can be removed. The inner wall of the pressure vessel 1 is provided with a multiplicity of nozzles 4, only a few of which are shown in FIG. 1. A nozzle 4A which is one of the nozzles 4, is provided with a pipe structure (or a feed water sparger) 5 having an inner diameter smaller than that of the nozzle 4A. In order to examine everything in such a place, a manipulator for carrying a working unit is required to give such various motions as shown in FIGS. 2A, 2B and 2C to the working unit. In more detail, in FIG. 2A, reference character $a_1$ indicates a rotary motion along the inner wall of the reactor vessel 1, and $a_2$ a vertical motion along the same inner wall. FIGS. 2B and 2C show the motion of the working unit in examining the inner surface and corner portion of the nozzle 4. In FIGS. 2B and 2C, reference characters $b_1$ and $c_1$ indicate a rotary motion about a horizontal axis of rotation, $b_2$ a forward and backward motion in the direction of the horizontal axis of rotation, $b_3$ and $c_2$ an extension and retraction in a radial direction with respect to the horizontal axis of rotation, and $b_4$ and $c_3$ a motion in a direction slanting from the horizontal axis of rotation in a plane containing the horizontal axis of rotation. A manipulator which gives these motions to the working unit, can be made up of six axes to permit, as shown in FIG. 3A, a rotary movement $\theta$ about a vertical axis (or a column), a vertical movement Z, a rotary movement about Tw about a horizontal axis of rotation, a forward and backward movement $X_R$ in a radial direction with respect to the axis of rotation, an extension and retraction $Y_R$ in the direction parallel to the axis of rotation, and a rotary movement $S_R$ of the mount of the working unit. A manipulator according to the present invention, however, has two arms for the reasons mentioned later, performs both coarse and fine movements in the vertical direction, includes additionally a traveling axis on a turntable for the purpose of exchanging working units, and thus can be made up of eleven axes as shown in FIG. 3B. This manipulator can perform another forward and backward movement $X_L$ in a radial direction with respect to the axis of rotation, another extension and retraction $Y_L$ in the direction parallel to the axis of rotation, a rotary movement $S_L$ of another mount, a vertical movement $Z_m$ for coarse adjustment, a vertical movement $Z_f$ for fine adjustment and a traveling movement $Y_o$, in addition to the movements carried out by the manipulator shown in FIG. 3A.

The 2-arm structure of the manipulator is made for the following two main reasons. Firstly, one of the arms is equipped at an end thereof with a working unit, and the other is equipped with a television camera to image continuously the working condition of the working unit by the television camera. Thus, when the end of the working unit is inserted into a narrow gap portion of the nozzle 4A or moved along respective corners of the nozzles 4 and 4A, the collision between the working unit and the nozzles due to wrong operation and deviation of position can be prevented and the leakage of defect-detecting fluid and the generation of abnormality in various parts and devices can be monitored. Such a television camera has to revolve round the center axis of the nozzle together with the working unit, in order to always view the working unit from the same side. As is apparent from the above-mentioned, another arm is needed which supports the television camera and adjusts the viewing position and angle and the field of view of the television camera. Another reason of the 2-arm structure is as follows. In the fluid penetration defect detecting apparatus which has to be inserted into a narrow gap, owing to a limitation in size, the inserted portion cannot be provided with all of the necessary functions. Accordingly, a defect-detecting fluid feeder, a sponge cleaner, a device for waste fluid disposal and the like are mounted on another arm, and all of the necessary functions are performed by co-operative action of two arms. The defect detecting fluid is a general term for three kinds of fluids including cleaning, penetrating and developing fluids. A surface under examination is first treated with the cleaning fluid to remove oils and fats as well as stains on the surface. Next, the penetrating fluid is applied to the surface, and penetrates into a crack of the surface, if any. Incidentally, the penetrating fluid is a solution containing a red dye. The penetrating fluid which adheres to the surface is wiped off with the cleaning fluid. Subsequently, the developing fluid is applied to the surface. The developing fluid is a white suspension containing powders of calcium carbonate, sucks out the penetrating fluid within the crack through capillarity, and displays on the surface a pattern having the same form as the crack.

Now, explanation will be made on inspection of the inside of a reactor pressure vessel. Prior to inspection, the operation of nuclear reactor is stopped for a predetermined period. Then, the upper cover 2 of the reactor vessel 1 shown in FIG. 1 is detached from the flange 3.

Figure 4:
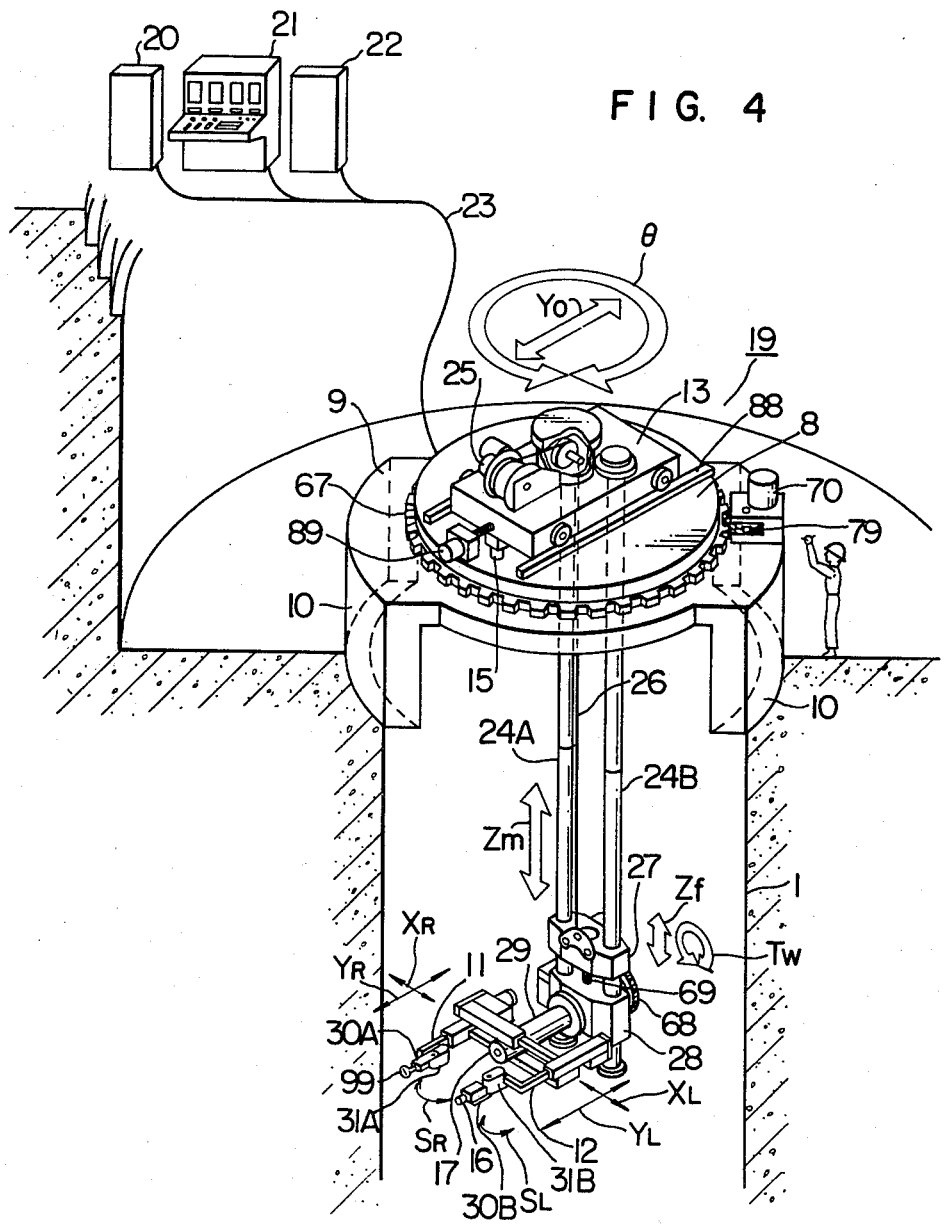
FIG. 4 is a perspective view showing a manipulator employed in an embodiment of the present invention.

A manipulator 19 for use in an apparatus for inspection of the inside of a reactor vessel 1 is mounted on the vessel 1, as shown in FIG. 4. Referring to FIG. 4 showing the entire structure of the manipulator 19, a pair of legs 10 of the manipulator 19 are placed on the flange 3 to insert the manipulator 19 into the reactor pressure vessel 1. The manipulator 19 includes eleven axes which give eleven degrees of freedom, so that eleven kinds of motions shown in FIG. 3B can be conducted. Further, the manipulator 19 is connected through a cable 23 to a control computer 20, a multiple unit control apparatus 21 and a servo control device 22, which are all placed at some distance from the reactor pressure vessel 1. The manipulator 19 includes a holder 9 on which a turntable 8 is mounted. The legs 10 are coupled with the bottom of the holder 9. A gear 67 is provided on the side face of the turntable 8. On the holder 9 is provided driving means 70 which include a gear 79 engaging with the gear 67 and give the rotary movement $\theta$ to the turntable 8. On the turntable 8 are arranged a pair of rails along which a movable stage 13 can travel. Driving means for giving the traveling movement $Y_o$ to the movable stage are provided on the holder 9. To the movable stage 13 are fixed a pair of vertical columns 24A and 24B which serve as rails for vertical motion. A wire winding apparatus 25 for winding up a wire 26 is provided on the movable stage 13. One end of the wire 26 is connected with a rise and fall base 27 which can rise and fall along the vertical columns 24A and 24B in the direction of $Z_m$. The rise and fall base 27 is coupled with a crosshead 28 through a mechanism which can conduct a fine adjustment of the distance between the base 27 and the crosshead 28. The crosshead 28 is further connected with the vertical columns 24A and 24B in such a manner that the crosshead 28 is free to slide along the columns 24A and 24B. The crosshead 28 is provided with a rotating shaft 29 which is rotatable about its own axis, as is indicated by Tw. At the end of the rotating shaft 29 are provided two arms 11 and 12 which are movable in radial directions $X_L$ and $X_R$ and axial directions $Y_L$ and $Y_R$ of the rotating shaft 29. Mounts 30A and 30B, on which working units of various kinds can be mounted, are disposed at respective ends of rotary means 31A and 31B. Incidentally, in FIG. 4, an automatic brushing unit 99 is mounted on the mount 30A. The rotary means 31A and 31B which conduct the rotary motions $S_R$ and $S_L$, are connected with the arms 11 and 12, respectively. A television camera 15 is disposed at an appropriate portion of the movable stage 13. Another television camera 17 is disposed at the end of the rotating shaft 29. A further television camera 16 is mounted on the mount 30B.

Figure 5:
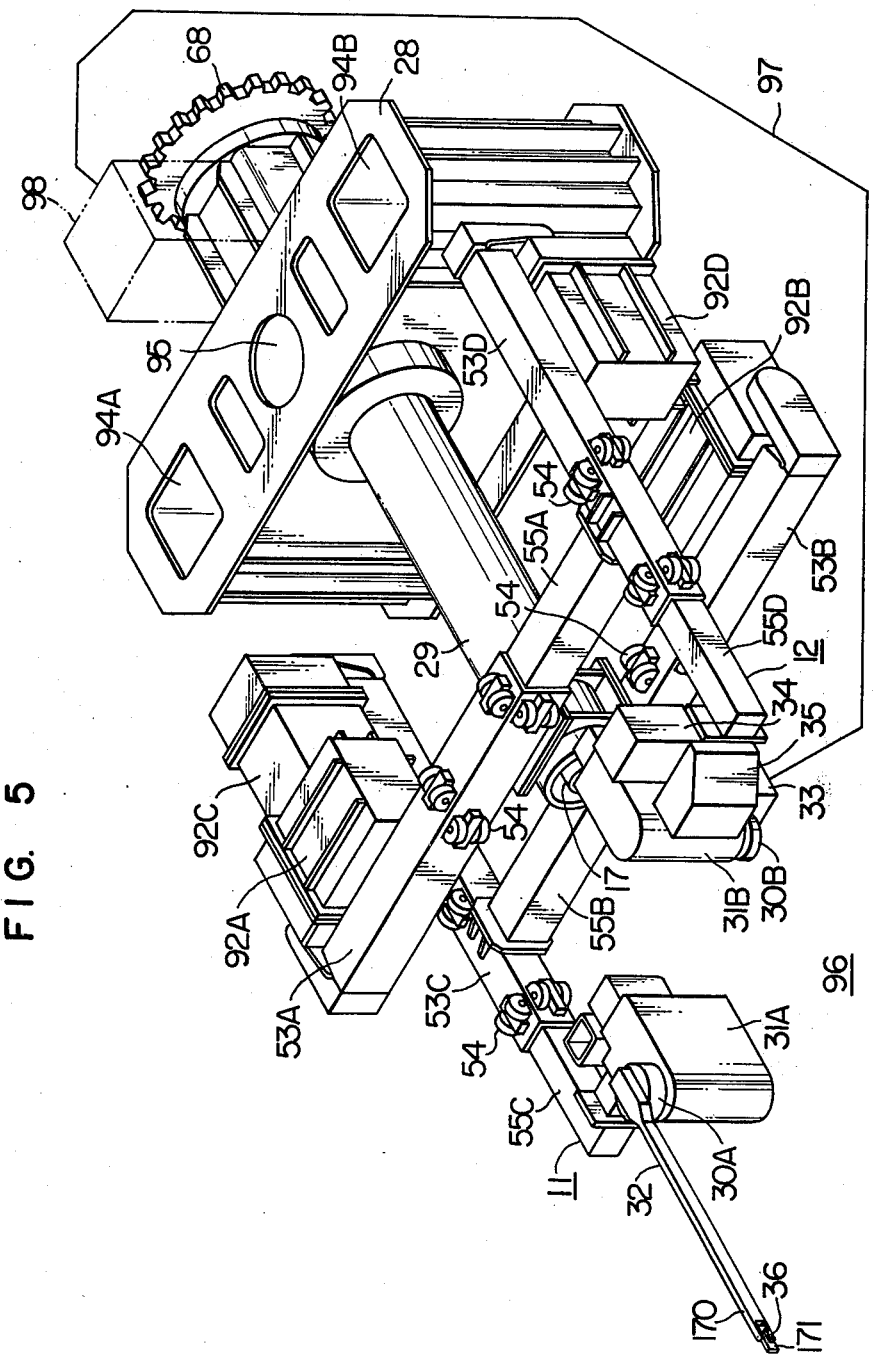
FIG. 5 is a perspective view showing a detailed structure in the vicinity of arms of the manipulator shown in FIG. 4.
Figure 8:
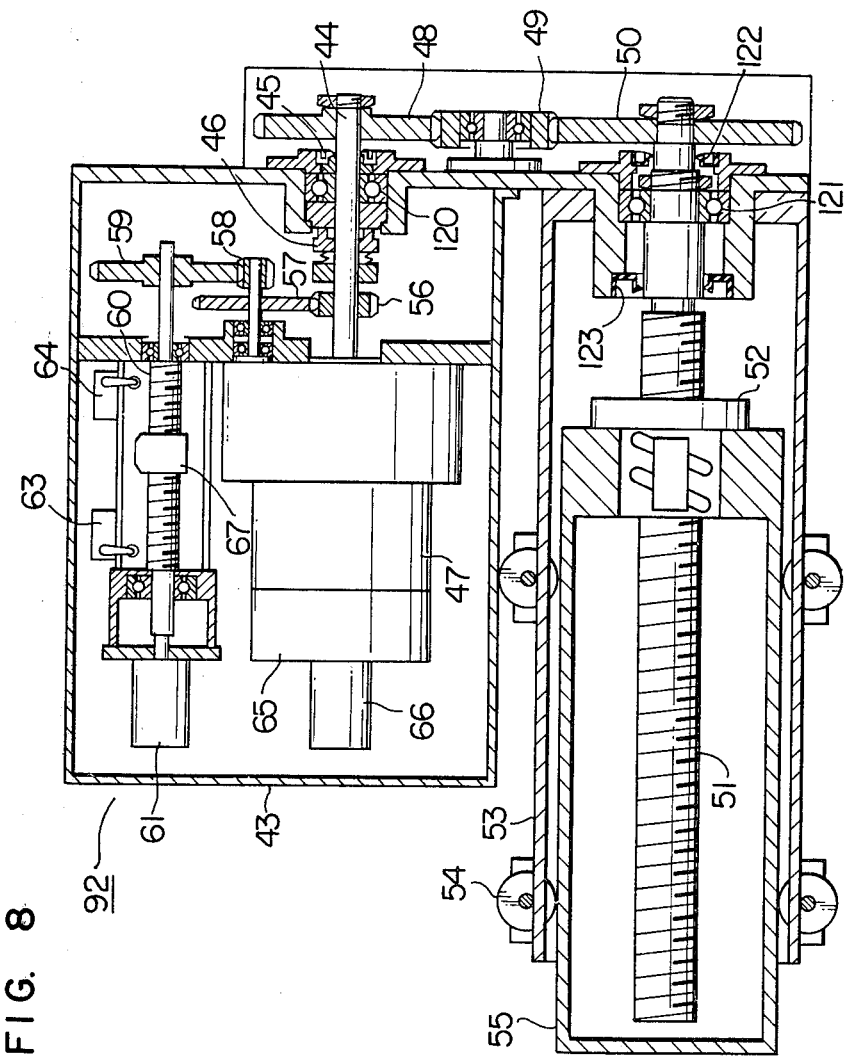
FIG. 8 is a longitudinal sectional view showing a representative driving device for each axis of the manipulator shown in FIG. 4.

A detailed structure of the arms 11 and 12 and their support is shown in FIG. 5. Referring to FIG. 5, the crosshead 28 is a rise and fall member which supports the arms 11 and 12 horizontally and can finely rise fall along the vertical columns 24A and 24B. In more detail, the vertical columns 24A and 24B are inserted in and are free to slide along square holes 94A and 94B, respectively, which are provided in the crosshead 28. A circular hole 95 defined in the crosshead 28 is provided with a ball nut 53 threaded on a ball screw 69 which connects the crosshead 28 with the rise and fall base 27. The crosshead 28 is provided at its central portion with the horizontal rotating shaft 29. The rotating shaft 29 is turned through the engagement of a driving gear 68 which is mounted on one end of the shaft 29, with a driving gear 48 of driving means 92 which are shown in FIG. 8 and will be described later. The rotary movement of the shaft 29 corresponds to the arrow Tw shown in FIG. 4. The driving means 92 for turning the driving gear 48 are mounted on the crosshead 28 in such a manner that the driving gear 28 is engaged with the driving gear 68. In this case, gears 49 and 50, a ball screw 51, a ball nut 52, square cylinders 53 and 55 and rollers 54 which are shown in FIG. 8, are all needless. A pair of square cylinders 53A and 53B are provided on the other end of the rotating shaft 29 at right angles with the shaft 29, and moreover are arranged in such a manner that the shaft 29 serves as an axis of symmetry. Driving means 92A and 92B are mounted on respective ends of the square cylinders 53A and 53B. Square cylinders 55A and 55B are inserted into the square cylinders 53A and 53B respectively, to form telescopic pipes. The square cylinder 55A is provided at its end with a square cylinder 53D on which driving means 92D are mounted. While, the square cylinder 55B is provided at its end with a square cylinder 53C on which driving means 92C are mounted. Square cylinders 55C and 55D are inserted into the square cylinders 53C and 53D respectively, and moreover the insertion is a sliding fit. The arm 11 is made up of the square cylinders 53B, 55B, 53C and 55C. While, the arm 12 includes the square cylinders 53A, 55A, 53D and 55D. The square cylinders 55C and 55D are provided with the rotary means 31A and 31B, respectively. The arm 11 is moved by the action of the driving means 92B and 92C in the radial and axial directions of the rotating shaft 29, which correspond to the radial movement $X_R$ and the extension and retraction $Y_R$. The arm 12 is also moved by the action of the driving means 92A and 92D in a manner corresponding to the radial movement $X_L$ and the extension and retraction $Y_L$. In order for the balance of the manipulator 19 not to be affected by the extension and retraction $Y_R$ and $Y_L$ of the square cylinders 55C and 55D, the crosshead 28 is provided on the same side as the gear 68 with a balance weight (not shown) which is displaced in proportion to the degree of extension and retraction of the square cylinders 55C and 55D.

In FIG. 5, the manipulator 19 is provided with, as an example of working units, an automatic penetration defect detecting apparatus 96, which is made up of an applying/wiping tool or unit 32, a defect-detecting fluid feeder 33 and so on. The applying/wiping unit 32 is mounted on the mount 30A of the arm 11. While, the defect-detecting fluid feeder 33, a defect-detecting fluid tank 34 and a valve box 35 are provided on the arm 12. The applying/wiping unit 32 includes at its end a forked connecting portion 170, which supports rotatably a rotating plate 171. To the rotating plate 171 is attached a sponge 36 which is used to apply and wipe off the defect-detecting fluid.

FIG. 6 shows how the applying/wiping unit 32 is attached to the arm 11. The mount 30A of the arm 11 is connected with four bolts 37 through pins 38 in such a manner that each bolt can fall using one of the pins 38 as an axis. The bolts 37 are fitted into four notches provided in a mounting bottom 39 of the applying/wiping unit 32, and thus the mounting bottom 39 are fastened to the mount 30A with the bolts 37 and nuts 40. The mount 30A is provided at the center thereof with a boss 41. A recess provided in the mounting bottom 39 is mated to the boss 41 to permit centering. Each of the bolts 37 is provided with a split pin 42 to prevent the nut 40 from being detached from the bolt 37. The rotating plate 171 is turned or brought to a stop by a link 173 connected with a disc 172 which is turned by means of an electric motor provided in the applying/wiping unit 32.

Figure 7:
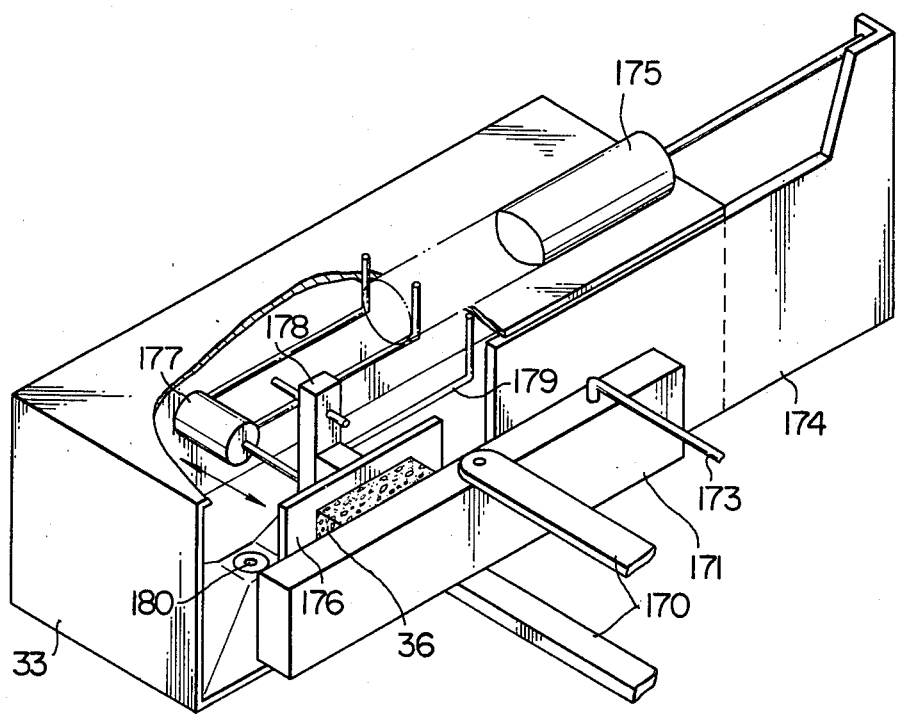
FIG. 7 is a perspective, partially cutaway view for explaining the operation of a penetrating fluid feeder.

In order to supply the defect-detecting fluid to the sponge 36 attached to the end of the applying/wiping unit 32, to clean the sponge 36, or to facilitate the recovery of a waste fluid produced in the cleaning process, the rotary means 31A of the arm 11 is driven so as to direct the applying/wiping unit 32 to the direction which makes a right angle with the arm 12, and the driving means 92A and 92D are operated to adjust the position of the square cylinders 55A and 55D and to bring the sponge 36 in contact with the defect-detecting fluid feeder 33 mounted on the arm 12. The state thus adjusted is shown in FIG. 7. The defect-detecting fluid feeder 33 shown in FIG. 5 is viewed from the back side in FIG. 7. A cover 174 is moved in the right or left direction by means of an air cylinder 175 to be closed or opened. In FIG. 7, the cover 174 is opened. A pressure plate 176 is supported by a member 178 connected with an air cylinder 177, and is moved forward and backward by means of the air cylinder 177. The pressure plate 176 is provided at the center thereof with a through hole which is connected with a defect-detecting fluid feeding tube 179. The defect-detecting fluid is supplied to the sponge 36 through the through hole. In cleaning the sponge 36, the cleaning fluid is supplied to the sponge 36 through the defect-detecting fluid feeding tube 179, and then sqeezed out of the sponge 36 by pushing the pressure plate 176 against the sponge 36. Such a pressure application is conducted by means of the air cylinder 177. After the sponge 36 has been supplied with the defect-detecting fluid from the defect-detecting fluid feeder 33, or cleaned, the rotary means 31 is agains driven to direct the applying/wiping unit 32 to the nozzle 4, and the rotating shaft 29 and the square cylinders 55B and 55C are operated to apply or wipe off the defect-detecting fluid. The waste fluid produced in cleaning the sponge 36 with the defect-detecting fluid feeder 33 is sent through a pipe 97 to a waste fluid tank 98 to be stored therein (see FIG. 5). The change-over of defect-detecting fluid and that of the operation of each of the air cylinders 175 and 177 are performed by change-over valves which are provided in a valve box 35 shown in FIG. 5.

The driving means 92A, 92B, 92C and 92D have the same structure as the driving means 92 shown in FIG. 8. The detailed structure of the driving means 92 will be explained by reference to FIG. 8. A square cylinder 53 corresponds to the square cylinders 53A, 53B, 53C and 53D, and a square cylinder 55 corresponds to the square cylinders 55A, 55B, 55C and 55D. All electric parts of the driving means 92 are placed within a hermetically sealed box 43 to permit underwaer use of the driving means 92. An output shaft 44 is made watertight by a sealing member 45 made of an elastic material and by a mechanical seal 46. The output shaft 44 is supported through a bearing 120 by the hermetically sealed box 43. The output shaft 44 of an electric motor 47 gives a turn to a ball screw 51 through a driving gear 48, a backlash adjusting gear 49 and a driving gear 50. The ball screw 51 is supported through a bearing 121 by the hermetically sealed box 43. The bearing 121 is sealed by sealing members 122 and 123. A ball nut 52 is threaded onto the ball screw 51, and is fixed to one end of a square cylinder 55 which is supported by rollers 54 provided in a square cylinder 53 to permit sliding motion. When the electric motor 47 is operated, the square cylinder 55 is moved linearly relative for the square cylinder 53 by means of the ball screw 51 and the ball nut 52. The output shaft 44 is further provided with a driving gear 56, and gives a turn to a screw rod 60 through reduction gears 57, 58 and 59 to turn an output shaft of a degree-of-rotation detector 61 mounted on the end of the screw rod 60. Since a constant ratio of rotation is formed between the screw rod 60 and the ball screw 51 through the gears, the position of the square cylinder 55 can be known from an electric signal taken out of the degree-of-rotation detector 61. A dog 62 is threaded on the screw rod 60, and is moved linearly through the rotation of the screw rod 60. Two limit switches 63 and 64 are provided along the screw rod 60, and the dog 62 is put in contact with the limit switches 63 and 64 at positions corresponding to the starting and end points of the stroke of the square cylinder 55 to permit change-over of a contact. An electromagnetic brake 65 and a speed-of-revolution detector 63 are incorporated into the electric motor 47. The electromagnetic brake 65 is released or applied according as the electricity is supplied or cut off. That is, when the power supply is stopped, the square cylinder 55 is prevented from moving for safety's sake.

The driving means 92 can be fastened to the movable stage 13 to form a driving mechanism of the movable stage 13. Further, the driving means 92 can be used as the rotary means 31A (or 31B) of the mount 30A (or 30B) by connecting the gear 50 with the rotating shaft of the mount 30A (or 30B) in place of the ball screw 51. Furthermore, the driving means 92 can give a turn to the turntable 8 by engaging the gear 49 with the gear 67 of the turntable 8.

Figure 10:
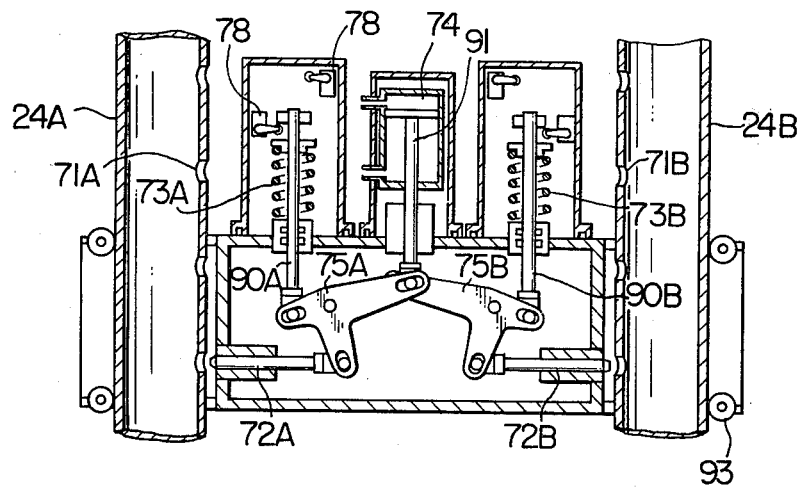
FIG. 10 is a longitudinal sectional view showing a mechanism for locking the rise and fall base shown in FIG. 9 to columns.
Figure 11:
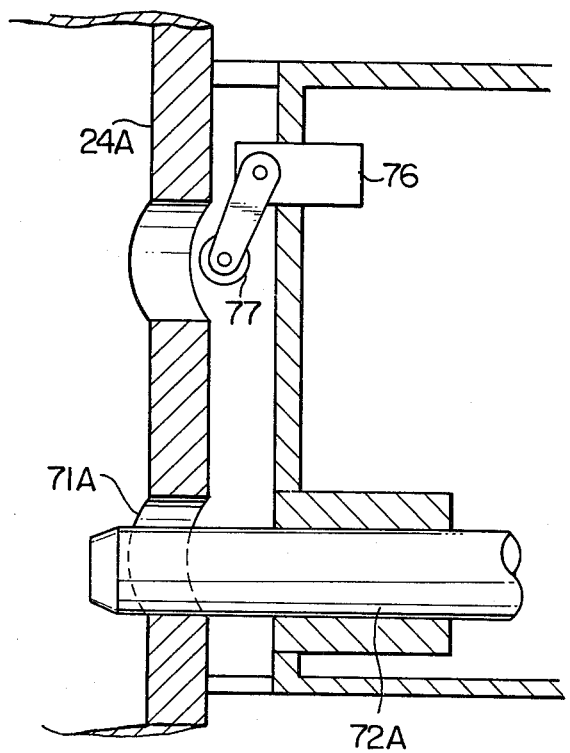
FIG. 11 is a view for explaining a locked state of the rise and fall base by means of the mechanism shown in FIG. 10.

For the vertical movement of the arms 11 and 12 of the manipulator 19, a high positional accuracy of the order of 0.1 mm is required in a movable range of about 10 m. In order to solve this problem. The portion for supporting the arms 11 and 12 is, as shown in FIG. 9, divided into upper and lower portions, namely, the rise and fall base 27 and the crosshead 28. The rise and fall base 27 is connected with the cross-head 28 through a ball screw 69, and is raised or lowered along the columns 24A and 24B in the direction of Zm by means of the wire rope 26 and the wire winding apparatus 25. In this case, since the length of the wire rope 26 is varied, it is difficult to conduct an accurate positioning. Therefore, as shown in FIG. 10, a multiplicity of holes 71A and 71B are provided at equal intervals in the columns 24A and 24B, respectively. The positioning of the rise and fall base 27 is conducted by inserting pins 72A and 72B into the holes 71A and 71B, respectively. The position of each of the holes 71A and that of the holes 71B are accurately defined in the columns 24A and 24B, respectively. As shown in FIG. 11, the diameter of the holes 71A and 71B is made greater than the outer diameter of the pins 72A and 72B to farilitate and guarantee the insertion of the pins 72A and 72B, and the positioning is conducted at a place where the pins 72A and 72B are brought in contact with the lowest point of the wall of each of the holes 71A and 71B. The pin 72A (or 72B) is always pressed against the column 24A (or 24B) by the action of a spring 73A (or 73B), which action is transferred through a rod 90A (or 90B) and a link 75A (or 75B) to the pin 72A (or 72B), to be readily inserted into one of the holes 71A (or 71B). When the pins 72A and 72B are pulled out of the holes 71A and 71B, respectively, to move the rise and fall base 27, a piston 91 in an air cylinder 74 is pushed up. When the power supply is stopped, the pins 72A and 72B are automatically inserted into the holes 71A and 71B, respectively, and thus the falling of the arms 11 and 12 is prevented. In order to insert the pins 72A and 72B into the holes 71A and 71B respectively, as is shown in FIG. 11, a roller 77 of a limit switch 76 is pressed against the column 24. When the roller 77 enters one of the holes 71A, which is upper by one interval than a hole 71A to be subjected to the insertion of the pin 72A, with the vertical motion of the rise and fall base 27, the contact of the limit switch 76 is changed over. An electric signal resulting from the change-over of the contact is used to change the direction in which air is supplied into the air cylinder 74. Thus, the piston 91 is pushed down so that the pin 72A is inserted into the hole 71A. The position of the pin 72A can be electrically detected by a limit switch 78. When the rise and fall base 27 is lowered, the wire winding apparatus 25 is operated to let loose the wire rope 26. Then, the rise and fall base 27 falls due to its own weight, and the pins 72A and 72B are placed on the lower portion of the wall of each of the holes 71A and 71B. Even when the length of the wire rope 26, namely, the height of the rise and fall base 27 is indicated by the signal from a degree-of-rotation detector (not shown) of the wire winding apparatus 25, if the pitch or interval of the holes 71A and that of the holes 71B are made slightly greater than the pitch of the signals delivered from the degree-of-rotation detector, one can know what holes 71A and 71B are subjected to the insertion of the pins 72A and 72B, respectively, irrespective of a little extension and retraction of the wire rope 26. Since the position of each of the holes 71A and 71B is accurately defined, the accurate positioning of the rise and fall base 27 is achieved stepwise. The height of the crosshead 28, which is connected with the rise and fall base 27 through the ball screw 69, relative to the rise and fall base 27 can be adjusted in the following manner. The driving means 92 shown in FIG. 8 are mounted on the rise and fall base 27. In this case, the ball screw 51 shown in FIG. 8 is replaced by the ball screw 69, and moreover the square cylinder 53, the rollers 54 and the square cylinder 55 become needless. The ball nut 52 is attached to the crosshead 28. The driving means 92 mounted on the rise and fall base 27 are operated to turn the ball screw 69. Thus, the crosshead 28 rises or falls along the columns 24A and 24B, that is, conducts the vertical motion indicated by $Z_f$. In order to permit the smooth motion of the rise and fall base 27 and the crosshead 28 along the columns 24A and 24B, there are provided rollers 93 as shown in FIG. 9. The positioning by the rise and fall base 27 is coarsely adjusted, and that by the crosshead 28 is finely adjusted.

The working units include the automatic brushing unit 99, the automatic visual testing unit 18 and the television camera 16, in addition to the previously-explained automatic penetration defect detecting apparatus 96. Each of these working units is mounted on the mount 30A or 30B, at need, as is shown in FIG. 6.

Figure 12:
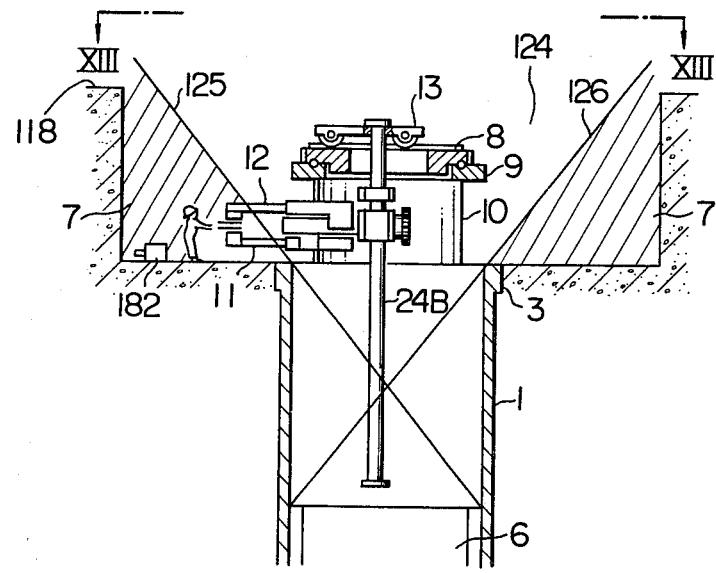
FIG. 12 is a view for explaining a method of exchanging working units.
Figure 13:
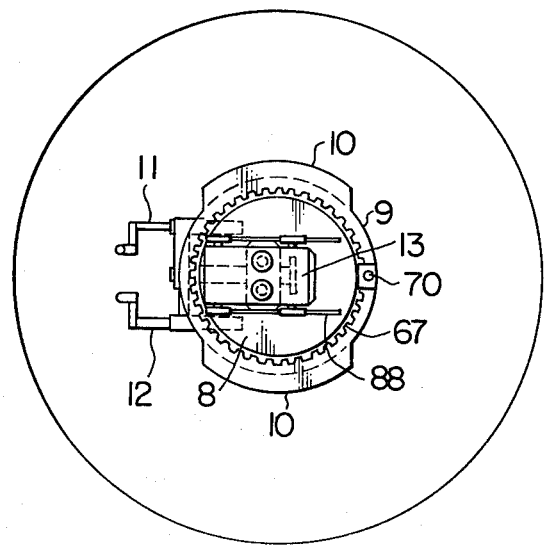
FIG. 13 is a plan viewed in the direction of arrows XII's shown in FIG. 12.

Now, explanation will be made on the exchange of these working units in the case where the automatic brushing unit 99 and the television camera 16 are mounted on the arms 11 and 12, respectively, as shown in FIG. 4. Referring to FIG. 5, the driving means 92C and 92D are operated so as to space the automatic brushing unit 99 mounted on the mount 30A and the television camera 16 mounted on the mount 30B apart from the inner wall of reactor pressure vessel. Then, the ball screw 69 is turned to raise the crosshead 28 and to bring the crosshead 28 in contact with the rise and fall base 27. The wire winding machine 25 is operated to wind the wire rope 26 round a drum of the machine 25 and to raise the rise and fall base 27. In such a manner, the arms 11 and 12 are raised to a position which is greater in height than the flange 3 of the reactor pressure vessel 1. Then, the working-unit mounting portion at the end of each of the arms 11 and 12 is protruded into a safe region 7 of a reactor well 124, as shown in FIG. 12. The height of the legs 10 of the holder 9 which support the turntable 8 of the manipulator 19, is so set as the arms 11 and 12 can be protruded between two legs 10 (see FIG. 13). Such an exchange operation as replacing the working unit mounted on the arm 11 by another working unit is performed in the safe region 7. Radioactive rays are emitted from a reactor core 6 in the reactor pressure vessel 1 to that region of the reactor well 124 which is limited by straight lines 125 and 126. In the safe region 7, there is little chance for exposure to radioactive rays, since the radioactive rays are prevented by the upper end of the reactor pressure vessel 1. After the exchange of working units has been completed, the new working unit is moved into the reactor pressure vessel 1 in a procedure reverse to the above-mentioned one. The exchange of other working units can be conducted in the same manner. When each unit of the automatic penetration defect detecting apparatus is employed as the working unit, the waste fluid within the waste fluid tank 98 is discharged through an exhaust device (not shown) provided on the floor of a nuclear reactor building. Incidentally, reference numeral 182 in FIG. 12 denotes a working unit for exchange.

Since the inspecting operation for the inside of the reactor pressure vessel 1 is conducted using the automatic brushing unit 99, the automatic penetration defect detecting apparatus 96 including several units, and the automatic visual testing unit 18 in the order described, these working units are exchanged in this order within the safe region 7. The supersonic detector may be employed.

Figure 14:
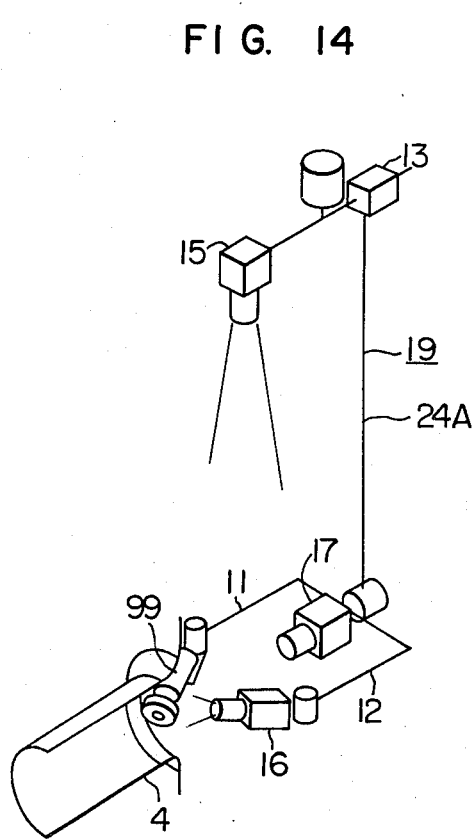
FIG. 14 is a view for showing an arrangement of television cameras mounted on the manipulator shown in FIG. 4.
Figure 15A:
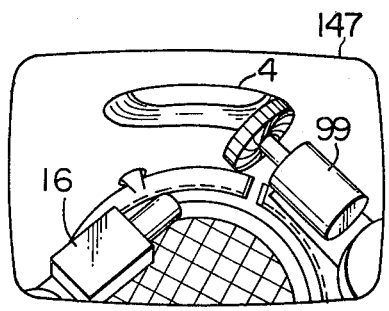
FIGS. 15A and 15C show picture images which are taken by the television cameras shown in FIG. 14 and are displayed by respective television monitors.
Figure 15B:
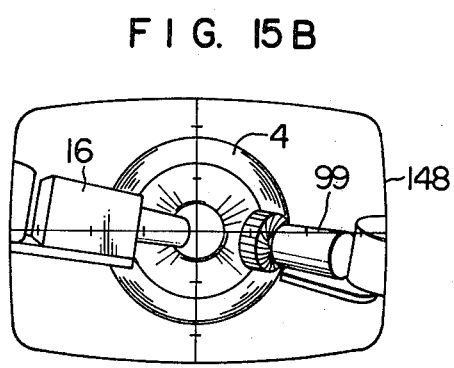
Figure 15C:
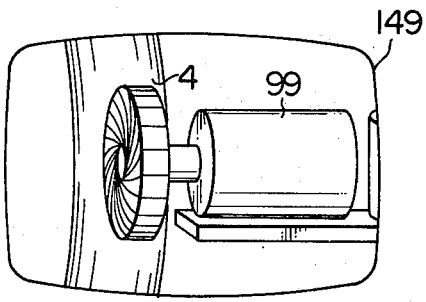

In order to monitor the movement of the manipulator 19 at the time when these working units are put in and out of the reactor pressure vessel 1 and at the time when the inside of the reactor pressure vessel 1 is subjected to inspection, three television cameras 15, 16 and 17 are always mounted on the manipulator 19, as shown in FIG. 14. In order to observe the whole working state, the television camera 15 is mounted on the movable stage 13 just above the arms 11 and 12 in such a manner as looking downward. The television camera 15 monitors the approach of the working units, the arms 11 and 12 and the television camera 16, which is mounted on the end of the arm 12, to the inner wall of the reactor pressure vessel 1. The state of approach is displayed on a television monitor 147, as shown in FIG. 15A. The television camera 16 monitors the automatic brushing unit 99 from the side thereof, which unit is driven by a built-in motor. The state observed by the camera 16 is displayed on a television monitor 149, as shown in FIG. 15C. The television camera 17 is mounted on the rotating shaft 29 with the axis of the camera 17 being coincident with the axis of the shaft 29. The picture image obtained by the camera 17 is displayed on a television monitor 148, as shown in FIG. 15B. A cross can be displayed on the picture plane of the television monitor 148 through superimposition. The positional adjustment of each axis of the manipulator 19 is conducted so as to place the image of the nozzle 4 at the central portion of the picture plane. Thus, the centering of the nozzle 4 is achieved. As mentioned above, the use of three television cameras makes it possible to monitor in detail the end portions of the arms 11 and 12, and prevents the working units and the television camera 16 from colliding with the inner wall of the reactor pressure vessel 1 and with obstacles in the vessel 11. Thus, there is little danger of broken pieces being dropped into the reactor core 6.

Figure 17A:
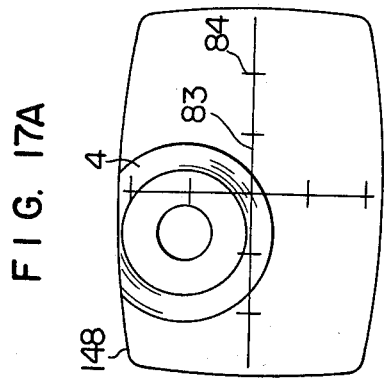
FIGS. 17A, 17B, 18A, 18B, 19A and 19B are views for explaining the centering operation between a nozzle and a rotating shaft.
Figure 17B:
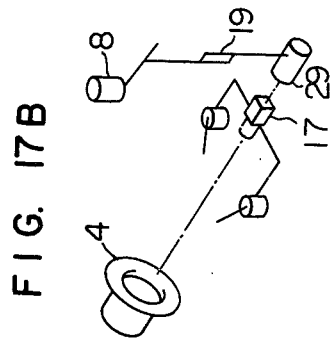
Figure 16:
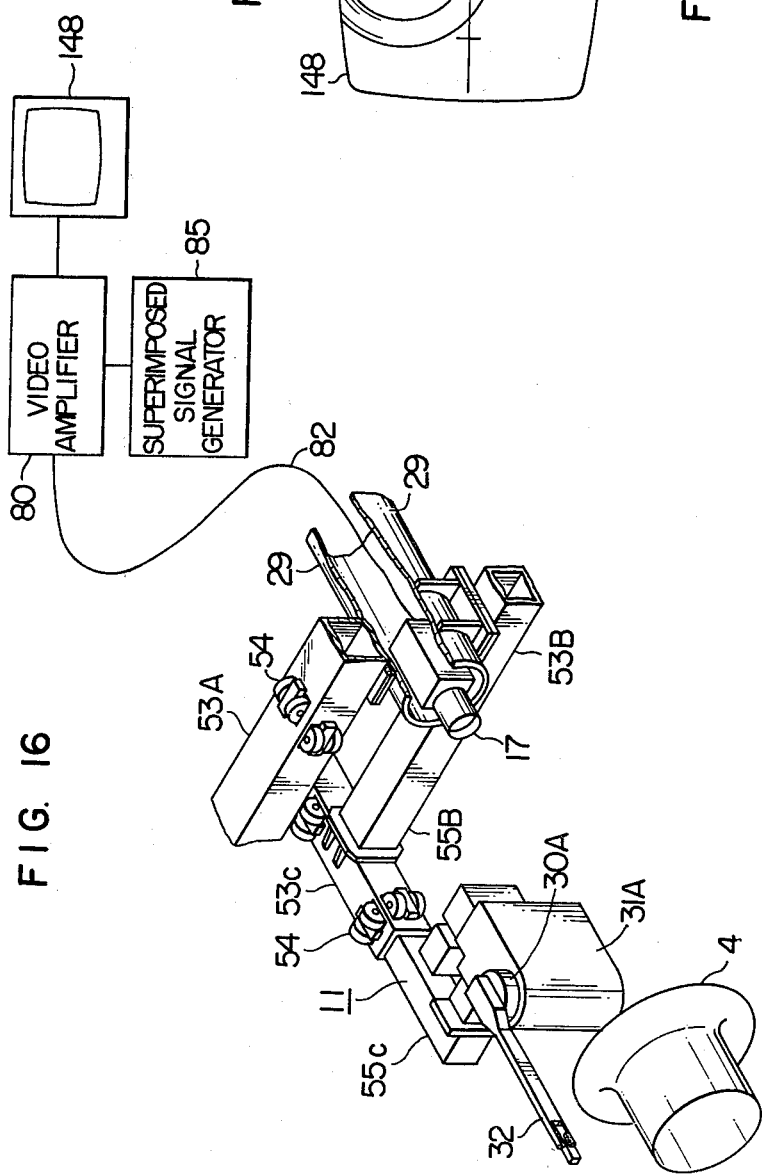
FIG. 16 is a system diagram for showing monitor means including a television camera 17 shown in FIG. 14.
Figure 18A:
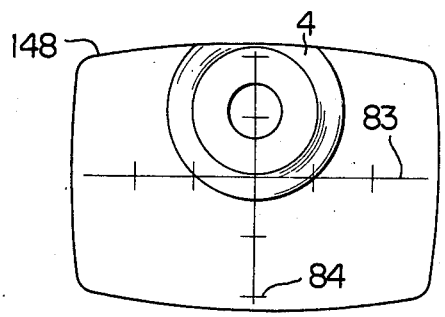
Figure 18B:
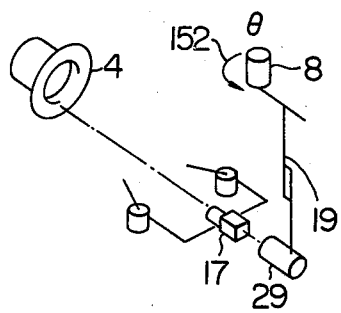
Figure 19A:
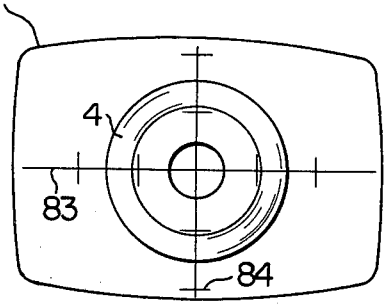
Figure 19B:
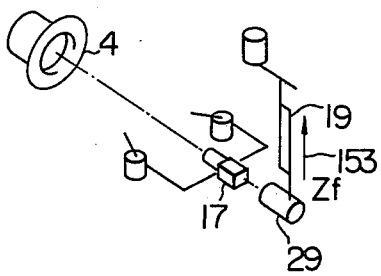

Now, the centering operation using the television camera 17 will be explained below by reference to FIGS. 16 to 19. The television camera 17 is attached to the rotating shaft 29 on the axis thereof, and is connected to a video amplifier 80 and the television monitor 148 through a cable 82. Further, in order to superimpose a cross 83 and a scale 84, both of which are shown in FIG. 19A and indicate the center of the picture plane of the television monitor 148 and the distance from the center, respectively, on a picture image obtained by the television 17, a superimposed signal generator 85 is connected to the video amplifier 80. When the arms 11 and 12 are positioned in the vicinity of the nozzle 4 to conduct an operation, such a picture image as shown in FIG. 17A is displayed by the television monitor 148. The television monitor 148 is built in the multiple unit control apparatus 21 shown in FIG. 4, and the picture plane of the monitor 148 is always watched by an operator. In the state shown in FIG. 17A, the axis of the nozzle 4 is not coincident with that of the rotating shaft 29, as is shown in FIG. 17B. The turntable 8 is turned in the direction of arrow 152 shown in FIG. 18B to make the circumferential line of the image of the nozzle 4 symmetrical with respect to the vertical line of the cross 83. Thus, the picture image shown in FIG. 18A is obtained. Next, the ball screw 69 is operated so as to raise the crosshead 28 in the direction of arrow 153 shown in FIG. 19B, and to obtain such a picture image as shown in FIG. 19A. In this manner, the axis of the nozzle 4 can be readily aligned with that of the rotating shaft 29. In the above operation, the scale 84 indicates a deviation of the axis of the nozzle 4 from that of the rotating shaft 29.

Figure 20A:
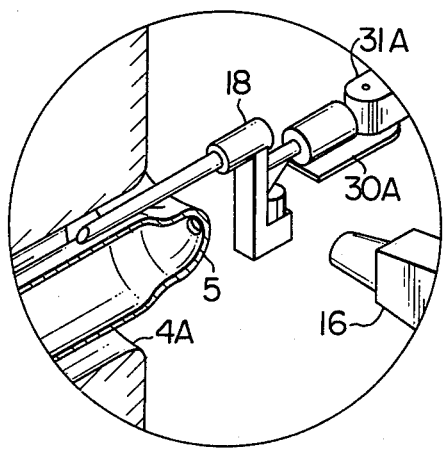
FIGS. 20A and 20B are views explaining an inspecting operation employing an automatic visual testing unit.
Figure 20B:
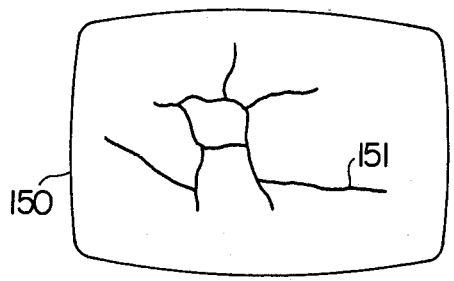

A further television camera, namely, the automatic visual testing unit 18, as shown in FIG. 20A, is mounted on the mount 30A of the arm 11. The automatic visual testing unit 18 is inserted into a narrow gap between the nozzle 4A and the feed water sparger 5 to examine defects in the surface of the nozzle 4A. The unit 18 includes a bundle of optical fibers to conduct such a motion as shown in FIG. 2B. The picture image obtained by the automatic visual testing unit 18 is displayed by a television monitor 150, as is shown in FIG. 20B. The inner surface of the nozzle 4A is applied the white developing fluid by the automatic penetration defect detecting apparatus 96. If there are defects in the surface of the nozzle 4A, the previously-applied red penetrating fluid oozes to the white film of developing fluid, and the defects 151 are indicated on the picture plane of the monitor 150, as is shown in FIG. 20B.

The picture image obtained by the automatic visual testing unit 18 is preferably stored by a video tape recorder (not shown) to reproduce later the image. In inspection of the reactor pressure vessel 1 employing the apparatus for inspection of the inside of the reactor pressure vessel, the operation of the reactor is stopped during the inspecting operation. Accordingly, the inspecting operation has to be completed in a short time. In view of the above fact. The automatic visual testing unit is so operated as to successively image a surface under examination while scanning the surface at a high scanning speed. The images thus obtained are stored in a video tape, and simultaneously are displayed by the television monitor to be watched by an inspector. When the abnormality is found, the mark indicating the abnormal position is spontaneously recorded in the video tape. The video tapes thus obtained are reproduced by a plurality of television monitors to be examined by a plurality of inspectors. The marked portions of the video tapes are reproduced at a low speed or as a still picture to permit detailed examination. According to the above-mentioned method, the time required for inspection of the inside of the reactor pressure vessel 1 is greatly reduced compared with the case where one inspector conducts a detailed inspection employing the television monitor. The above-mentioned mark may be recorded as an audio signal or superimposed on the picture image as an index. These mark recording can be readily conducted through well-known video recording techniques.

Figure 21:
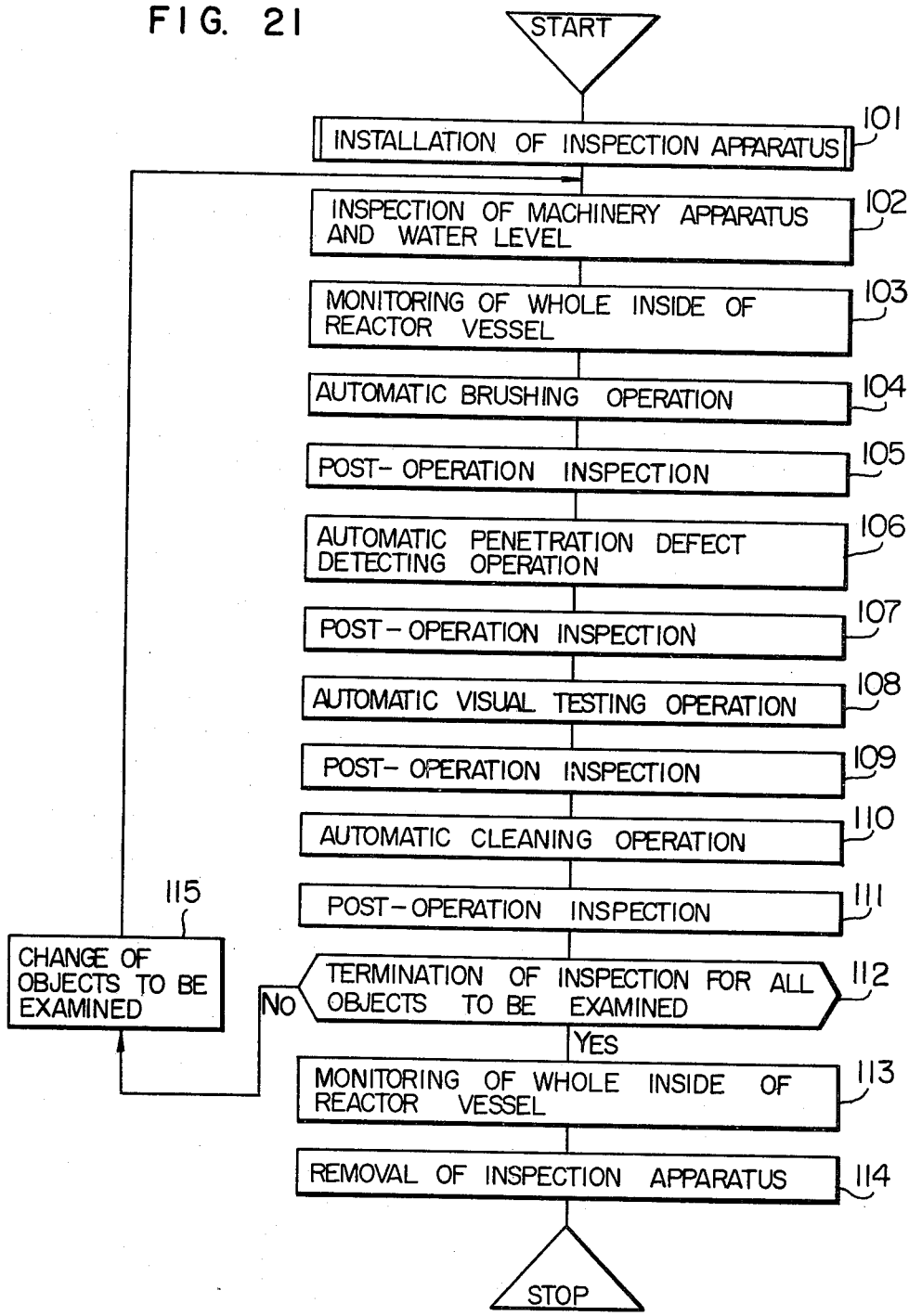
FIG. 21 is an explanatory view showing a procedure in an inspecting operation which employs the manipulator shown in FIG. 4.

FIG. 21 shows an example of a general procedure of the inspecting operation employing the apparatus for inspection of the inner wall of the reactor pressure vessel 1, the nozzle 4 and the inside of the vessel 1. In step 101, an automatic apparatus for inspection of the inside of reactor vessel is installed on the reactor pressure vessel 1 by persons, and the electric wiring is conducted. In step 102 and subsequent steps, operations are conducted under man's instruction. In step 102, inspection is made on the presence or absence of abnormality in the apparatus and machinery for inspection of the inside of reactor vessel, and on the water level in the reactor pressure vessel 1. In the above inspection, after the whole external appearance of the manipulator has been visually examined, the system for inspection of the inside of reactor vessel is connected to the power supply, and inspection is made on many items in accordance with a program prepared for inspection of abnormality. The inspection items according to this program are as follows: whether a normal voltage is applied to each part or not, whether a working unit is correctly mounted on each arm 11 or 12 or not, whether each axis of the manipulator is placed at an initial predetermined position or not, whether the arms 11 and 12 are brought to respective stroke ends or not, whether compressors and vacuum pumps are normally operated or not, whether various set states in the multiple unit control apparatus 21 are consistent with each other or not, whether the water level of coolant is equal to a predetermined level or not, and so on. This program permits reliable inspection of abnormality without overlooking any items required for check of abnormality. When the abnormality is detected in this inspection, an alarm lamp on the operation board of the multiple unit control apparatus 21 is turned on, which alarm lamp is one of alarm lamps equal in number to the check items and corresponds to the detected abnormality. The operator studies the position and contents of trouble, and the repair work is conducted, if repairable. Then, inspection of abnormality is again made. If the trouble is not repairable, the inspecting operation is stopped to consider a counterplan. When the absence of abnormality is judged in step 102, next step is conducted. That is, the whole inside of the pressure vessel 1 is monitored. The television camera 16 mounted on the manipulator 19 is moved as shown in FIG. 2A to conduct a rough inspection of the inside of the pressure vessel 1. When the operator finds the abnormality of the picture plane of the television monitor 149, he pushes a stop switch or button to stop the movement of the television camera 16 and to deal with the abnormality. When the operator finds no abnormality, the operation in step 104 is conducted. That is, the automatic brushing operation is performed for the nozzle 4 or 4A to be examined, or for the inner wall of the reactor pressure vessel 1 to remove extraneous matter from surface. In this operation, the automatic brushing unit 99 mounted on the arm 11 is moved as shown in FIG. 2B or 2C in accordance with the shape of the object to be examined. In step 105, the result of the brushing operation is inspected by the television camera 16. When a black portion is left on the brushed surface, it is indicated that the brushing operation is insufficient, and therefore the step 104, namely, the brushing operation is again conducted. When it is judged in step 105 that a satisfactory brushing operation has been conducted, the automatic penetration defect detecting operation is performed in step 106. In this operation, the defect-detecting fluid is applied to the object to be examined, in accordance with the previously-mentioned procedure. The result of operation is inspected by the television camera 16 in step 107. If the application or wiping of the defect-detecting fluid is not perfect, the automatic penetration defect detecting operation is again performed in step 106. When the operation has been satisfactorily conducted, the automatic visual testing operation is performed in step 108. In this operation, the image of the place applied with the defect-detecting fluid is taken by the special television camera of the automatic visual testing unit 18, and displayed by the television monitor 150, which is placed at a position of extremely low radioactive level, to be observed by the operator. When some defect is found in the object under examination, the operator informs the apparatus for inspection of the inside of reactor vessel of the presence of the defect, and the position of the defect is recorded. Such an automatic visual testing operation is conducted for a specified region of one object to be examined. After this operation has been completed, the post-operation inspection is made in step 109, and then the automatic cleaning operation is performed in step 110. In the automatic cleaning operation, the defect-detecting fluid applied in the automatic penetration defect detecting operation is wiped off by the applying-/wiping unit 32. Since the defect-detecting fluid does not become solid, the spongs 36 can be used both for application and for wiping. Prior to wiping, the cleaning fluid is supplied to and squeezed out of the sponge 36 in order to sufficiently wash away the defect-detecting fluid contained in the sponge 36. When it is judged in step 111 that the defect-detecting fluid is satisfactorily wiped off, it is judged in step 112 whether the inspection of the inner wall of reactor vessel and the nozzle portion, which are to be inspected, is all completed or not. This judgement is made in such a manner that parts to be inspected is listed, and that one mark is given to the list each time the inspection of one part is completed, to erase that part. When inspection is not made on all of the parts to be inspected, such a setting operation as changing the part to be inspected is performed on the control board (step 115). The object to be inspected includes four feed water nozzles, a main steam nozzle and the like. All of the above-mentioned operations have to be performed for each of these nozzles. In step 115, therefore, a part which is not yet inspected, is set, and the operations in steps 102 to 112 are performed for that part. In the above-mentioned process, the working units have to be exchanged. This exchange is made in the following manner. The arms 11 and 12 are brought to the exchange position shown in FIG. 12 to replace the working unit having been used by the working unit for the next operation. The above replacement is conducted by disengaging four bolts as shown in FIG. 6. When it is judged that all of the parts to be examined have been inspected, the inside of the reactor vessel 1 is scanned by the television camera 16, as shown in FIG. 2A, to monitor the whole inside and to inspect any damage or the like which happens during the above examination (step 113). When no abnormality is found, the automatic inspection apparatus for inspection of the inside of reactor vessel is removed from the reactor pressure vessel 1 by persons. Thus, all the inspecting operations are completed.

Powders produced in the brushing operation are removed by a dust collector, and the surplus of the defect-detecting fluid applied to the object under inspection is sucked up by a vacuum tank, in order for the powders and fluid not to fall in the reactor core 6.

Figure 22:
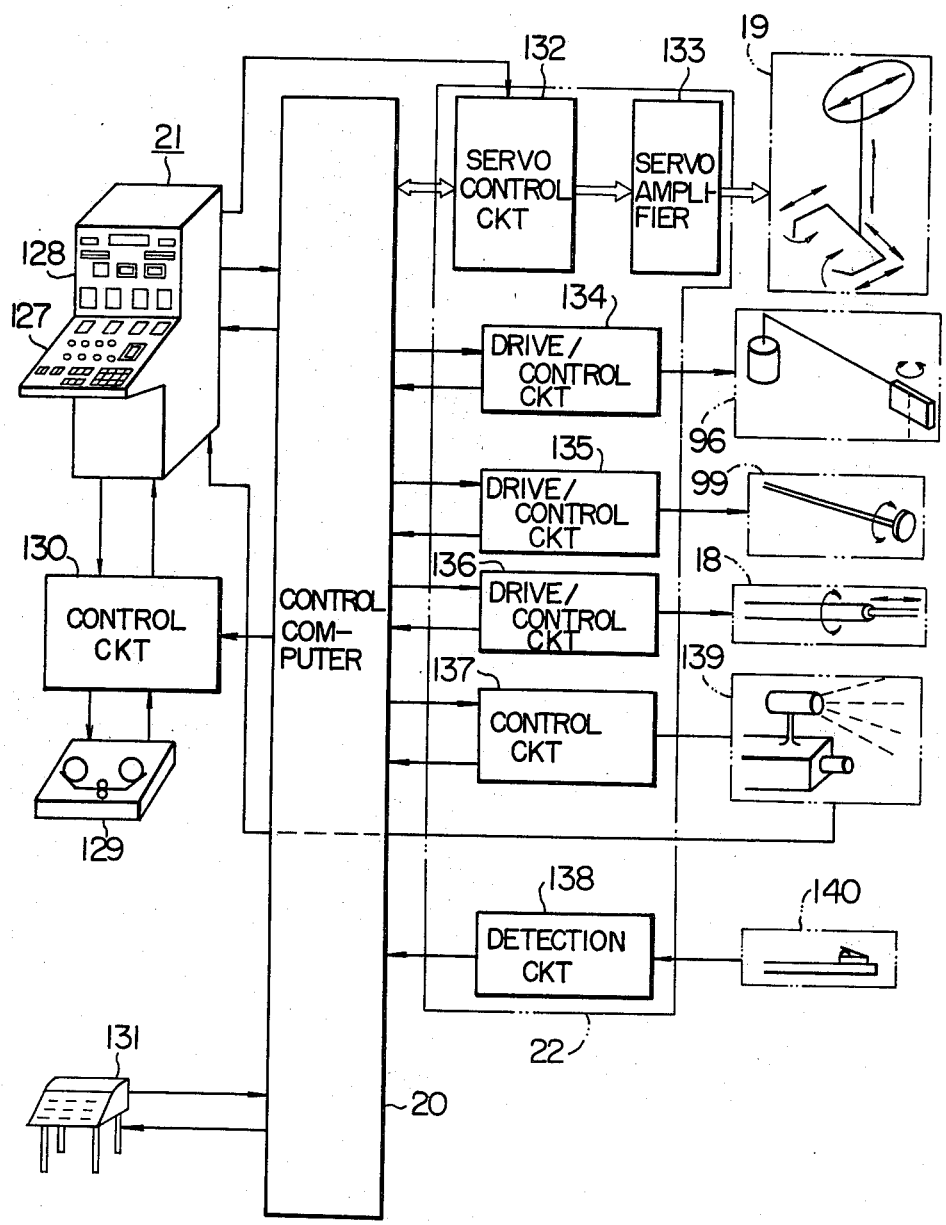
FIG. 22 is a view showing a control system for use in a system for inspection of the inside of a nuclear reactor vessel according to a preferred embodiment of the present invention.

FIG. 22 shows the construction of a control system which controls the apparatus for inspection of the inside of reactor vessel. The control system includes a control computer 20 which forms the main part of the system, a multiple unit control apparatus 21 having an operation board 127 and a display board 128, a video tape recoder set 129 for recording video images displayed on the picture plane of a television monitor, a control circuit 130 for the video tape recorder set 129, a typewriter 131 for printing the contents of data supplied to the control computer 20, a servo control circuit 132 for conducting the positioning control for driving means of each eleven axes of the manipulator 19, a servo amplifier 133, a drive/control circuit 134 for the automatic penetration defect detecting apparatus 99, a drive/control circuit 136 for the automatic visual testing unit 18, a control circuit 137 for an image pickup device 139 including three television cameras 15, 16 and 17 and associated illumination lamps, and a detection circuit 138 for amplifying the output voltage of a pretection sensor 140 made up of limit switches which are mounted on tip portions of the arms 11 and 12, that is, on the most risky portions for collision.

Figure 23:
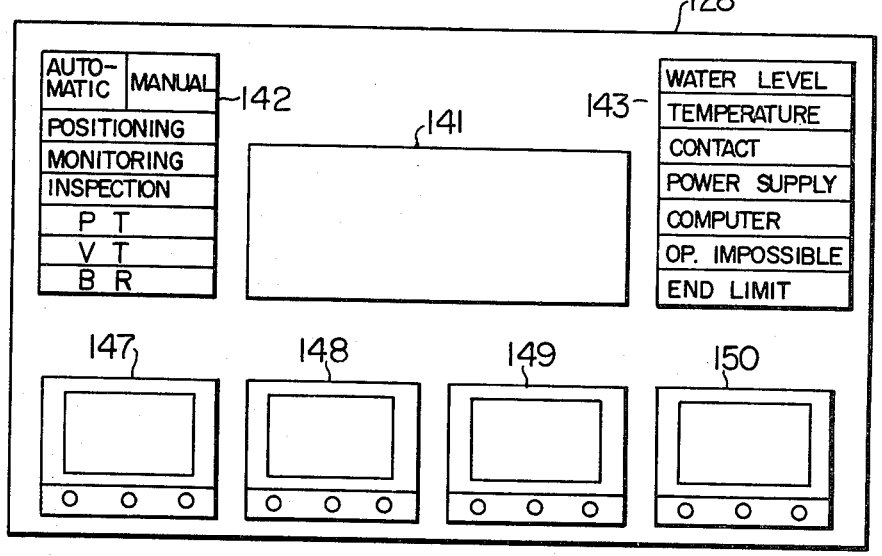
FIG. 23 is an elevational view of a display board shown in FIG. 22.

FIG. 23 shows an example of the display board 128 which is positioned at the upper portion of the multiple unit control apparatus 21 and gives various information to the operator. The display board 128 includes a television monitor 147 for displaying the video image obtained by the television camera 15, television monitors 148, 149 and 150 having the same function as the television monitor 147 and corresponding to the television cameras 17 and 16 and the automatic visual testing unit 18, respectively, a general purpose display device 141 for displaying, in the form of figures, symbols, or patterns, or the like, those positional information and operational state of each axis of the manipulator which have been converted into electric signals by the control computer 20, pilot lamps 142 for indicating an operation mode which is now set, and alarm lamps 143 for indicating an abnormal state in the course of the operation of step 102 shown in FIG. 21.

Figure 24:
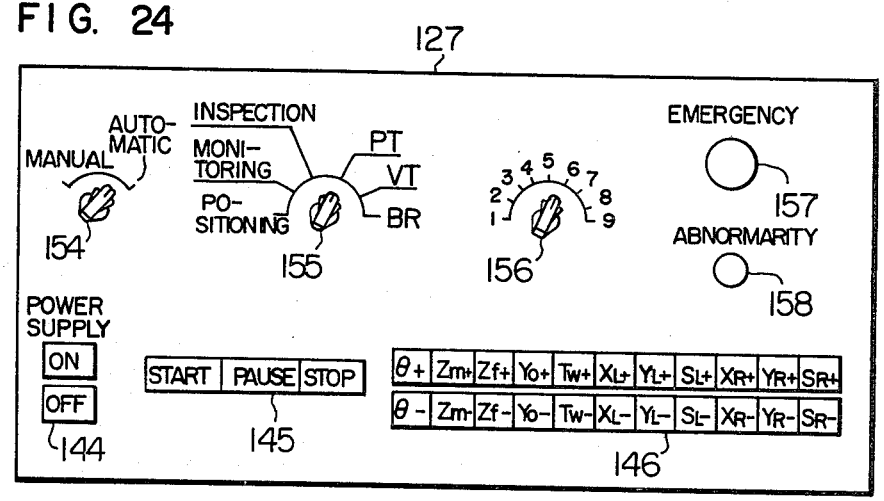
FIG. 24 is a plan view of an operation board shown in FIG. 22.

FIG. 24 shows an example of the operation board 127 which is positioned at the front of the multiple unit control apparatus 21 and includes a group of switches operated by the operator. The operation board 127 includes a power switch 144, a switch 145 having three kinds of switches or buttons START, PAUSE and STOP which instruct the program-controlled movement of the manipulator, twenty-two axis movement switches or buttons 146 for use in moving respective axes of the manipulator in the manual operation or in the manual adjustment, a change-over switch 154 for changing over the automatic and manual operations, a mode change-over switch 155 for indicating the contents of operation, a position indicating switch 156 for indicating the position to be inspected, an emergency stop switch 157, and an abnormality switch 158 operated when a defect is found in the visual test. In the mode change-over switch 155, "PT", "BR" and "VT" indicate the penetration test, the brushing and the visual test, respectively. "INSPECTION" indicates that such a series of operations as the brushing, the penetration test and the visual test are performed. One of the pilot lamps 142 is turned on in correspondence with the set state of the mode change-over switch 155 through a relay. In the position indicating switch 156, numbers are allotted to a plurality of parts to be inspected and a plurality of nozzles, and the object subjected to inspection is specified by indicating one of the numbers. Now, let us assume that the change-over switch 154 is set for the manual mode and the button "$\theta_+$" of the axis movement switch 146 is depressed. Then, the electric signal from the multiple unit control apparatus 21 is directly supplied to the servo control circuit 132. Respective symbols of the axis movement switch 146 correspond to the movement symbols shown in FIG. 3B. Suffixes "+" and "−" indicate movements in one direction and in the reverse direction, respectively. FIG. 25 shows the servo control circuit 132 and the associated servo system thereof for one axis. One of a position instruction $P_c$ from the control computer 20 and a manual position instruction $P_m$ in the manual mode is selected in an interface circuit 159 to be applied to a digital subtractor 160. The difference between the present position instruction P and the output of a digital encoder 165 which detects the present position, is obtained by the digital subtractor 160. The difference is converted by a digital-analog converter 161 into an analog quantity to be used as a speed instruction. In a speed control circuit 162, a predetermined calculation is effected employing both the speed instruction and the feedback quantity of speed detected by a tachogenerator 164 to deliver an output which turns an electric motor 163 through the servo amplifier 133. In such a manner, the positioning of each axis of the manipulator 19 is conducted. In the servo system shown in FIG. 25, an electromagnetic brake 167 is incorporated in the motor 163, and is operated by a brake signal BR supplied from the control computer 20. In general, the electromagnetic brake 167 is applied by a spring, and released by the brake signal BR. That is, the brake 167 is released when the motor 163 turns.

In such an operation of the digital servo system, when the button $\theta_+$ is depressed, the position instruction $P_m$ which indicates the present position of the turntable 8 of the manipulator 19 is increased at a constant speed. The position instruction $P_m$ is stored in a counter, and the counter counts up pulses at a constant speed to increase the position instruction $P_m$. The degree of rotation of the turntable 8 is increased with the increase of the position instruction $P_m$. Accordingly, an inching operation can be conducted by appropriately depressing the switches $\theta_+$ and $\theta_-$. In a similar manner, the inching operation can be performed for any one of other axes.

Next, the automatic operation will be explained. At first, the change-over switch 154 is set for the automatic mode. The mode change-over switch 155 is set to "INSPECTION". In this state, the button "START" of the switch 145 is depressed. Then, the control computer 20 reads a program out of a read only memory (ROM) which is incorporated in the control computer 20, based upon states of respective switches on the operation board 127, which program controls the movement of the television camera 16 so as to move the camera 16 along the line shown in FIG. 2A. The program mainly stores therein a target value and a moving speed. Referring to FIG. 2A, in the case that the motion $a_1$ is conducted, the turntable 8 is turned from initial angular position $\theta_A$ to a final angular position $\theta_B$. The speed of revolution of the turntable 8 is defined by the position signal $P_c$ shown in FIG. 25 which is increased or decreased at a constant speed defined by the program. In this case, the target value is $\theta_B$, and the motion $a_1$ is stopped when the angular position of the turntable 8 reaches $\theta_B$. Subsequently, the rise and fall base 27 is lowered in the direction of $Z_m$ by a predetermined distance which is defined by the program, that is, the motion $a_2$ is conducted. Then, the turntable 8 is turned in the direction reverse to the above-mentioned direction from $\theta_B$ to $\theta_A$ at a constant speed according to the program, and then the rise and fall base 27 is lowered by the predetermined distance. Such motions are repeated many times, as shown in FIG. 2A. The above-mentioned program control of manipulator can be conducted in a well-known method. As a result of the above motions, the arms 11 and 12 of the manipulator 19 are moved from top to bottom in the reactor pressure vessel 1. The state of the pressure vessel 1 in the course of movement is displayed by the television monitors 147, 148 and 149, and thus can be visually monitored by the operator. When, in such an automatic monitoring operation, the protection sensor 140 shown in FIG. 22 detects that the arm is brought in contact with the inner wall of the pressure vessel 1, the control computer 20 immediately sends a halt instruction to the servo control circuit 132, and the electromagnetic brake 168 is operated so as to stop the motor. Simultaneously, the portion "CONTACT" of the alarm lamp 143 is turned on to inform the operator of abnormality. The protection sensor 140 is mounted on each of the tips in the X- and Y-directions of each arm. The kind, position or the like of the sensor and the inner wall which are brought in contact with each other, are displayed by the display device 141 to show the abnormal state to the operator in a plain manner.

Figure 26A:
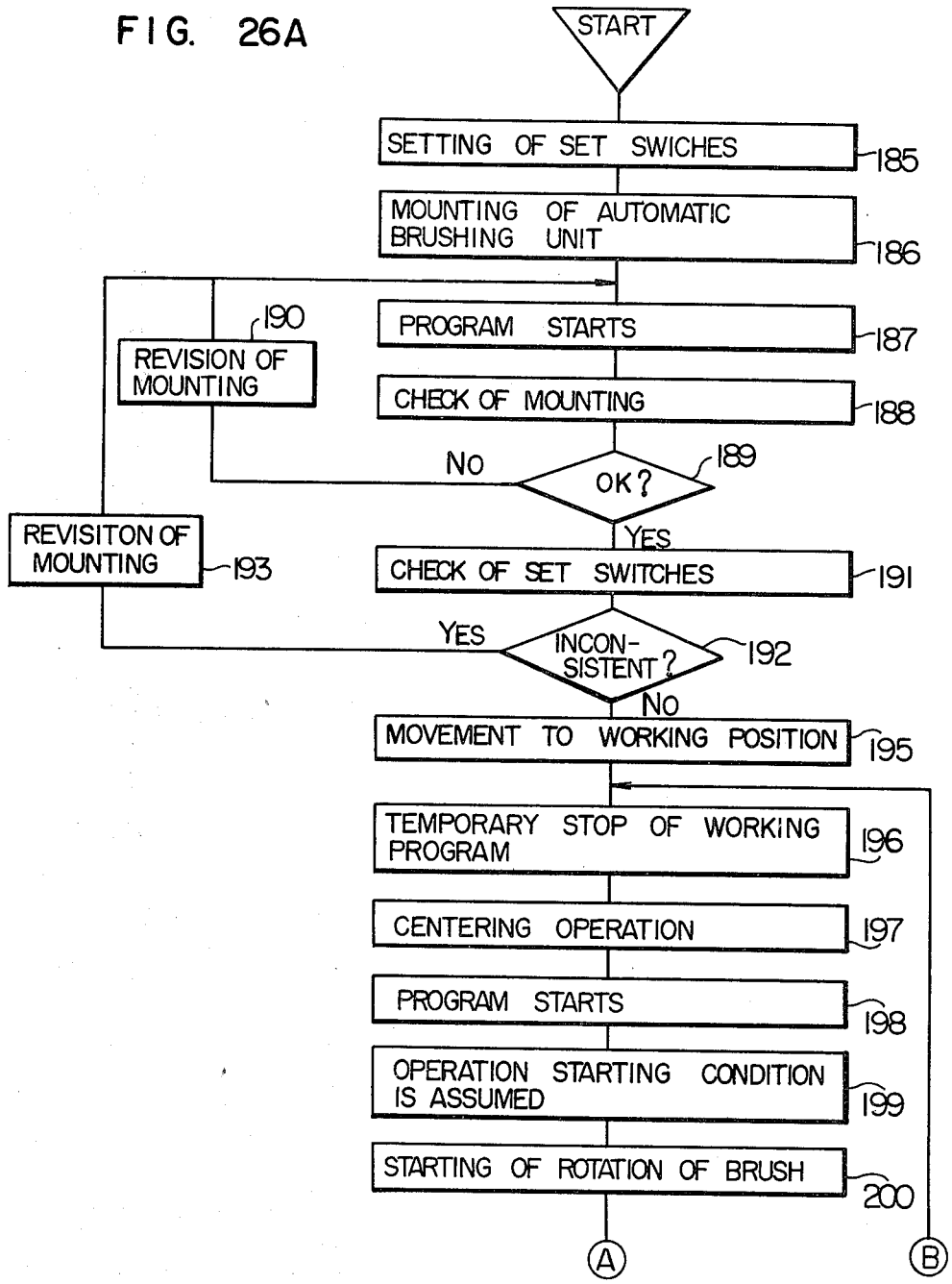

The brushing operation which is an example of the operation employing a working unit, will be explained below by reference to FIG. 26.

The manipulator 19 is put in the state as shown in FIG. 12 in which the arms 11 and 12 are placed above the pressure vessel 1. Further, let us assume that step 103 shown in FIG. 21 has been just completed. At first, the change-over switch 154, the mode change-over switch 155 and the position indicating switch 156 of the operation board 127 shown in FIG. 24 are set to "AUTOMATIC", "BR" and "1", respectively (step 185). Next, the automatic brushing unit 99 is mounted on the mount 30A of the arm 11 of the manipulator 19 in such a manner as shown in FIG. 6 (step 186). The button "START" of the switch 145 is depressed (step 187). Then, the operation according to an abnormality checking program commences, and it is checked whether the wirings of the automatic brushing unit 99 is correctly connected or not (step 188). When the presence of abnormality is judged in step 189, the display device 141 or the pilot lamp 142 teaches the abnormality to the operator. In this case, the operator recommences the mounting of the automatic brushing unit 99 (step 190). Then, the button "START" of the switch 145 is depressed. When the result of check is satisfactory, the control computer 20 accesses a next check program, and reads out electrically the states of the set switches on the operation board to check whether the states are consistent with each other or not (step 191). When it is judged in step 192 that the states are incosistent with each other, the operator are taught in the same manner as above. In this case, the operator has to recommence the setting of switches of the operation board 127 (step 193). When the switches are correctly set, a program for brushing operation is read out. In step 195, the Yo-axis, Zm-axis and $\theta$-axis of the manipulator 19 are successively operated based upon an instruction from the control computer 20 and in accordance with the operation explained with respect to FIG. 25. Incidentally, for example, the Yo-axis means the axis which moves in the direction of Yo. Thus, the rotating shaft 29 is moved to a position at which the rotating shaft 29 and the nozzle face each other, as shown in FIG. 14. In this state, the movement of the manipulator 19 is temporarily stopped (step 196). In this period of stoppage, the axis of the rotating shaft 29 is aligned with the axis of the nozzle in such a manner as explained by reference to FIGS. 17A to 19B through the operation of the axis moving switch 146 (step 197). This centering operation is conducted for the reason that the positioning of the brushing unit based upon the position data of the nozzle which is derived from the design dimension of the pressure vessel 1, is not always correct due to a deviation of the position of the manipulator 19 and the deformation of the pressure vessel 1 caused by welding. When it is judged by the operator that a satisfactory centering is obtained, the button "START" of the switch 145 is depressed to access a next working program (step 198). In step 199, the $X_R$-, $Y_R$-, $S_R$- and Tw-axes of the manipulator 19 are successively moved by the servo control circuit 132 and the servo amplifier 133, based upon the instruction from the control computer 20, to bring the brush near the starting position of the brushing operation. In step 200, the brush beings to make a turn, and the $Y_R$-axis is moved, to bring the rotating brush in contact with the inner wall of the pressure vessel 1 (step 201). At this time, the reaction force from the inner wall is read in by the control computer 20, and the $Y_R$- and $S_R$- axes are so adjusted as to maintain the applied pressure at a constant value. The reaction force can be detected by such operations as both by difference signal delivered from the digital subtractor 160 of the servo control circuit 132 shown in FIG. 25 and the speed signal from the tachogenerator 164 are read in and compared by the control computer 20. In other words, a large value of the difference signal at a time when the speed signal is small, indicates that the load of motor is large, namely, that the reaction force is great. Next, the brush is moved along such a scanning pattern as shown in FIG. 2B or 2C while being applied with a constant pressure, to perform the brushing operation in a working region (step 202). The shape of the scanning pattern and the range of the working region are stored in the memory of the control computer 20. When it is judged in step 203 that the brushing operation in the entire working region has been completed, the rotation of the brush is stopped (step 204), and the $Y_R$-axis is moved to space the automatic brushing unit apart from the wall (step 205). At this time, the working program is temporarily stopped (step 206). A query message as to whether a next working object is present or not, is sent to the display device 141 (step 207). When it is shown by the display device 41 that the next working place is present (step 208), the position indicating switch 156 on the operation board 127 is set to a number corresponding to the next working place (step 209), and the button "START" is depressed (step 210). Then, the Yo-, $\theta$- and Zm- axes are moved to bring the rotating shaft 29 near the next working place (step 211). Subsequently, the operation is conducted in the same procedure as before. In the case when the brushing operation in all places has been completed, the button "START" is depressed without operating the position indicating switch 156 to automatically restore the arms 11 and 12 to the initial position shown in FIG. 12 (step 212). Then, the step 105 shown in FIG. 21 is conducted. Other works can be performed in the same procedure as the brushing operation, but are different in working unit used and in a part of the working program from the brushing operation.

Such a program control employing a computer as above can be readily realized by the skilled in the art based upon the contents disclosed hereinbefore.

Further, explanation will be made on the automatic visual testing operation indicated by step 102 in FIG. 21. The mode change-over switch 155 on the operation board 127 is set to "VT", and the position indicating switch 156 set to "6". In this case, the automatic visual test is conducted in the place having a position number of 6, for example, in the nozzle 4A. In this state, the button "START" of the switch 145 is depressed. Then, the control computer 20 drives the servo control circuit 132 and the servo amplifier 130 so as to bring the automatic visual testing unit 18 near the nozzle 4A which is to be examined. The movement of the rotating shaft 29 is stopped for a predetermined time at a place where the axis of the rotating shaft 29 is approximately aligned with that of the nozzle 4A. In this state, the operator observes the video image on the television monitor 148, and depresses the button "PAUSE" of the switch 145 when it is judged that the two axes are shifted from each other. Thus, the automatic visual test is stopped. In this state, the operator operates the buttons "$X_L$", "$X_R$", and so on of the axis moving switch 146 while observing the video image on the television monitor 148 to make the axis of the rotating shft 29 coincident with that of the nozzle 4A. After this adjustment, the button "START" of the switch 145 is again depressed to commence the automatic visual testing operation from the corrected state. Since, as described above, the operator adjusts the relative position between the nozzle 4A to be examined and the manipulator 19 employing the television monitor 148, a correct operation can be performed even when the positioning by the control computer 20 is low in accuracy. Thus, the automatic visual testing unit 18 can be inserted deep in the nozzle 4A to be examined, and the state of things are momentarily displayed on the television monitor 150. While, the working condition is monitored by observing the video image on the television monitor 149. When a defect is found on the video image on the television monitor 150, the abnormality switch 158 is operated. Upon the application of the above switch signal, the control unit 20 sends the positional information of the automatic visual testing unit 18 (or coordinate data of each axis of the manipulator 19) at this time, through the control circuit 130, to the video tape recorder set 129 which records the video image on the television monitor 150, to simultaneously store the positional information in the video tape recorder set 129. Furhter, the positional information is printed by the typewriter 131. The positional information can specify the part having the defect, and when it is desired to observe the same defect later, the positioning of the manipulator can be conducted by employing the coordinate data of each axis of the manipulator, which make up the positional information, as the target values, moreover, the state of the defect at this time is recorded and can be readily reproduced later by the video tape recorder device 129. The same method is applicable to the automatic penetration defect detecting operation and the automatic brushing operation.

Further, when it is desired to move the arm portion of the manipulator 19 to a given place, for example, when it is desired to bring the arm provided with a working unit to a place which is positioned above the reactor pressure vessel 1 and is relatively low in level of radioactivity, that is, the safe region 7, and to inspect the working unit, the following operation may be performed. At first, the position instruction with respect to each axis of the manipulator 19 is inputted to the control computer 20 by the typewriter 131 to be stored in the computer 20. Next, the mode change-over switch 155 is set to "POSITIONING", and the button "START" of the switch 145 is depressed. Then, the control computer 20 generates a specification signal which brings each axis of the manipulator 19 to a specified place automatically.

According to such an embodiment as mentioned above, the automatic operation depending upon the control computer 20 and the manual operation employing four television monitors can be well combined with each other, and there is provided a control system easy to operate.

As has been explained hereinbefore, according to the embodiment of the present invention, the complicated inside of reactor pressure vessel can be readily inspected, and moreover a great positional accuracy is achieved.

FIG. 27 shows an exemplary embodiment in which the brushing unit 99, the television camera 16 for monitor/visual test, the applying and wiping unit 32 and the automatic visual testing unit 18 are radially disposed on the mount 30A of the arm 11. This embodiment which can move one of the working units to a suitable place by the rotary means 31A, can make the manual exchange of working units needless, and therefore is advantageous from the standpoint of prevention of exposure to radioactive rays.

As has been described above, the present invention has such advantages that a high positional accuracy can be obtained, and that the complicated inside of reactor vessel can be readily inspected.

We claim:

1. A system for inspection of the inside of a nuclear reactor vessel comprising:
   a support mounted on an upper portion of said nuclear reactor vessel;
   a movable stage positioned for movement on said support;
   column means supported by said movable stage and extended into said nuclear reactor vessel;

rise and fall means supported by said column means and arranged for movement in an axial direction of said nuclear reactor vessel;

a rotating shaft supported by said rise and fall means and extended in the radial direction of said nuclear reactor vessel;

first and second arm means supported by said rotating shaft and arranged for expansion and contraction substantially in both axial and radial directions of said rotating shaft independent of the movement of the rotating shaft or the rise and fall means;

means supported by said rise and fall means for rotating rotating shaft; and inspecting means for inspecting a defect in said nuclear reactor, said inspecting means including a working unit mounted on the end of said first arm means, first monitor means mounted on the end of said second arm means for monitoring said working unit, second monitor means mounted on the end of said rotating shaft for monitoring a centering operation for aligning the axis of a nozzle in said nuclear reactor vessel with that of said rotating shaft and for monitoring said working unit, and third monitor means mounted on said movable stage for monitoring the movement of said first and second arms.

2. A system according to claim 1 further comprising recording means for recording information from said inspection means.

3. A system according to claim 2, wherein said recording means include means for recording the information related to said defect and the defect indicating information in said recording means.

4. A system according to claim 1 wherein said rise and fall means includes a first rise and fall member supported by said column means and movable relatively to said support in an axial direction of said column means, and a second rise and fall member supported by said first rise and fall member and movable relatively to said first rise and fall member in said axial direction of said column means in a finely adjustable manner, for supporting said rotating shaft.

5. A system according to claim 1, wherein said working unit is a penetration defect-detecting apparatus.

6. A system according to claim 5, wherein said penetration defect-detecting apparatus includes a brushing unit for brushing said part to be inspected, a defect-detecting-fluid applying unit for applying a defect-detecting fluid to said part to be inspected, and a visual testing unit for visually examining the presence of said defect in said part to be inspected.

7. A system according to claim 4 or 1, wherein said working unit is a visual testing unit.

8. A system according to claim 4 or 1, wherein said working unit is a supersonic flaw detector.

9. A system according to claim 4 or 1, wherein said nozzle forms an annular space between the inside wall thereof and a cylindrical member which is inserted into said nozzle, and said working unit is inserted into said annular space to inspect said nozzle.

10. A system according to claim 4 or 1, wherein said working unit is a brushing unit.

11. A system according to claim 4 or 1, wherein each of said first and second arm means comprises a first member mounted on said rotating shaft in such a manner that said first member is expanded and contracted in a radial direction of said rotating shaft and a second member mounted on said first member in such a manner that said second member is expanded and contracted in an axial direction of said rotating shaft.

12. A system according to claim 4 or 1, wherein the center of said second monitor means is coincident with the axis of said rotating shaft.

13. A system according to claim 11, wherein the center of said second monitor means is coincident with the axis of said rotating shaft.

14. A system according to claim 4 or 1, wherein said first, second and third monitor means are television camera, respectively.

15. A method for inspection of the inside of a nuclear reactor vessel comprising the steps of:

controlling a movement of an inspection device for inspecting a defect in a nuclear reactor vessel by a drive/control device to permit inspection of a part to be inspected in said nuclear reactor vessel by said inspection device;

determining the presence or absence of said defect in said nuclear reactor vessel based upon information from said inspection device in the course of said movement of said inspection device;

pursuing and monitoring said movement of said inspection device by monitor means for monitoring said movement of said inspection device;

suppressing said movement of said inspection device by said drive/control device when the presence of an abnormality in said movement of said inspection device is determined based upon information from said monitor means, to avoid said abnormal movement; and performing a defect detecting operation by brushing said part to be inspected in said nuclear reactor vessel by a brushing unit for brushing said part to be inspected with said controlled movement of said inspection device, said brushing unit being included in said inspection device, applying a defect detecting fluid to said part to be inspected by a defect detecting fluid applying unit with said controlled movement of said inspection device, said defect detecting fluid applying unit being included in said inspection device, and detecting said defect in said part to be inspected by a visual testing unit with said controlled movement of said inspection device, said visual testing unit being included in said inspection device.

* * * * *